(12) United States Patent
Li et al.

(10) Patent No.: US 11,930,538 B2
(45) Date of Patent: Mar. 12, 2024

(54) IMPROVING PHYSICAL RANDOM-ACCESS CHANNEL (PRACH) ROBUSTNESS AGAINST INTERFERENCE

(71) Applicant: Telefonaktiebolaget LM Ericsson (publ), Stockholm (SE)

(72) Inventors: Jingya Li, Gothenburg (SE); Naga Vishnu Kanth Irukulapati, Västra Frölunda (SE); Sebastian Faxér, Stockholm (SE); Henrik Sahlin, Mölnlycke (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 17/276,308

(22) PCT Filed: Sep. 2, 2019

(86) PCT No.: PCT/SE2019/050819
§ 371 (c)(1),
(2) Date: Mar. 15, 2021

(87) PCT Pub. No.: WO2020/060463
PCT Pub. Date: Mar. 26, 2020

(65) Prior Publication Data
US 2023/0143073 A1    May 11, 2023

Related U.S. Application Data

(60) Provisional application No. 62/732,607, filed on Sep. 18, 2018.

(51) Int. Cl.
*H04W 74/08* (2009.01)
*H04L 5/14* (2006.01)

(52) U.S. Cl.
CPC ....... *H04W 74/0841* (2013.01); *H04L 5/1469* (2013.01); *H04W 74/0866* (2013.01)

(58) Field of Classification Search
CPC .......... H04W 74/0841; H04W 74/0866; H04L 5/1469
See application file for complete search history.

(56) References Cited

U.S. PATENT DOCUMENTS

2011/0250913 A1* 10/2011 Vajapeyam ....... H04W 74/0833
455/507
2013/0242730 A1* 9/2013 Pelletier ............ H04W 74/0833
370/230

OTHER PUBLICATIONS

PCT International Search Report and Written Opinion dated Nov. 8, 2019 for International Application No. PCT/SE2019/050819, 12 pages.

(Continued)

*Primary Examiner* — James P Duffy
(74) *Attorney, Agent, or Firm* — Sage Patent Group

(57) ABSTRACT

Embodiments include methods, performed by a network node, for configuring a physical random-access channel (PRACH) of a cell in a time-division-duplexed (TDD) radio access network (RAN). The methods include determining an increase in a level of remote interference in the cell and, in response to determining the increase, selecting a first PRACH configuration from a first subset of available PRACH configurations. The first subset of available PRACH configurations can be more robust against remote interference than a second subset of the available PRACH configurations, and the first subset can be exclusive of the second subset. The methods also include transmitting, to one or more user equipment (UEs) first information indicating that the first PRACH configuration should be used for accessing the cell via the PRACH. Embodiments also include complementary methods performed by UEs, as well (Continued)

as network nodes and UEs configured to perform such methods.

18 Claims, 17 Drawing Sheets

(56) References Cited

OTHER PUBLICATIONS

Qualcomm Incorporated, 3GPP TSG RAN WG1 Meeting #94, R1-1809455, "Mechanisms for Improving Network Robustness", Gothenburg, Sweden, Aug. 20-24, 2018, 2 pages.
Qualcomm Incorporated, 3GPP TSG RAN WG1 Meeting #94, R1-1809456, "Mechanisms for Identifying Strong gNB Interferers", Gothenburg, Sweden, Aug. 20-24, 2018, 3 pages.
CMCC, "Draft Summary on Study on NR-RIM", 3GPP TSG RAN WG1 Meeting #94, R1-1809973, Gothenburg, Sweden, Aug. 20-24, 2018, 30 pages.

* cited by examiner

```
TDD-UL-DL-ConfigCommon ::=          SEQUENCE {
 -- Reference SCS used to determine time domain boundaries in the UL-DL pattern which must be common across all sub-
 -- carrier specific virtual carriers, i.e., independent of the actual subcarrier spacing using for data transmission.
 -- Only the values 15 or 30 kHz (<6GHz), 60 or 120 kHz (>6GHz) are applicable.
 -- Corresponds to L1 parameter 'reference-SCS' (see 38.211)
 referenceSubcarrierSpacing          SubcarrierSpacing                                        OPTIONAL, -- Periodicity of the DL-UL pattern. Corresponds to L1 parameter 'DL-UL-transmission-periodicity' (see 38.211)
 dl-UL-TransmissionPeriodicity       ENUMERATED {ms0p5, ms0p625, ms1, ms1p25, ms2, ms2p5, ms5, ms10}   OPTIONAL, -- Number of consecutive full DL slots at the beginning of each DL-UL pattern.
 -- Corresponds to L1 parameter 'number-of-DL-slots' (see 38.211, Table 4.3.2-1)
 nrofDownlinkSlots                   INTEGER (0..maxNrofSlots)                                OPTIONAL, -- Number of consecutive DL symbols in beginning of slot following last full DL slot (derived from nrofDownlinkSlots).
 -- If the field is absent or released, there is no partial-downlink slot.
 -- Corresponds to L1 parameter 'number-of-DL-symbols-common' (see 38.211)
 nrofDownlinkSymbols                 INTEGER (0..maxNrofSymbols-1)                            OPTIONAL,    -- Need R -- Number of consecutive full UL slots at the end of each DL-UL pattern.
 -- Corresponds to L1 parameter 'number-of-UL-slots' (see 38.211, Table 4.3.2-1)
 nrofUplinkSlots                     INTEGER (0..maxNrofSlot)                                 OPTIONAL, -- Number of consecutive UL symbols in end of slot preceding the first full UL slot (as derived from nrofUplinkSlots).
 -- If the field is absent or released, there is no partial-uplink slot.
 -- Corresponds to L1 parameter 'number-of-UL-symbols-common' (see 38.211)
 nrofUplinkSymbols                   INTEGER (0..maxNrofSymbols-1)                            OPTIONAL     -- Need R
```

FIG. 5

| PRACH Config. Index | Preamble format | $n_{SFN} \bmod x = y$ | | Subframe number | Starting symbol | Number of PRACH slots within a subframe | $N_t^{RA,slot}$, number of time-domain PRACH occasions within a RACH slot | $N_{dur}^{RA}$, PRACH duration |
|---|---|---|---|---|---|---|---|---|
| | | x | y | | | | | |
| 145 | B4 | 16 | 1 | 9 | 0 | 2 | 1 | 12 |
| 146 | B4 | 8 | 1 | 9 | 0 | 2 | 1 | 12 |
| 147 | B4 | 4 | 1 | 9 | 2 | 1 | 1 | 12 |
| 148 | B4 | 2 | 1 | 9 | 0 | 1 | 1 | 12 |
| 149 | B4 | 2 | 1 | 9 | 2 | 1 | 1 | 12 |
| 150 | B4 | 2 | 1 | 7,9 | 2 | 1 | 1 | 12 |
| 151 | B4 | 2 | 1 | 4,9 | 2 | 1 | 1 | 12 |
| 152 | B4 | 2 | 1 | 4,9 | 0 | 2 | 1 | 12 |
| 153 | B4 | 2 | 1 | 8,9 | 0 | 2 | 1 | 12 |
| 154 | B4 | 2 | 1 | 2,3,4,7,8,9 | 0 | 1 | 1 | 12 |
| 155 | B4 | 1 | 0 | 1 | 0 | 1 | 1 | 12 |
| 156 | B4 | 1 | 0 | 2 | 2 | 1 | 1 | 12 |
| 157 | B4 | 1 | 0 | 4 | 0 | 1 | 1 | 12 |
| 158 | B4 | 1 | 0 | 7 | 2 | 1 | 1 | 12 |
| 159 | B4 | 1 | 0 | 9 | 0 | 2 | 1 | 12 |
| 160 | B4 | 1 | 0 | 9 | 2 | 1 | 1 | 12 |
| 161 | B4 | 1 | 0 | 9 | 2 | 2 | 1 | 12 |
| 162 | B4 | 1 | 0 | 4,9 | 2 | 1 | 1 | 12 |
| 163 | B4 | 1 | 0 | 7,9 | 0 | 2 | 1 | 12 |
| 164 | B4 | 1 | 0 | 8,9 | 2 | 1 | 1 | 12 |
| 165 | B4 | 1 | 0 | 3,4,8,9 | 2 | 1 | 1 | 12 |
| 166 | B4 | 1 | 0 | 1,3,5,7,9 | 0 | 1 | 1 | 12 |
| 167 | B4 | 1 | 0 | 0,1,2,3,4,5,6,7,8,9 | 0 | 2 | 1 | 12 |
| 168 | B4 | 1 | 0 | 0,1,2,3,4,5,6,7,8,9 | 2 | 1 | 1 | 12 |

FIG. 9A

| PRACH Config. Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration | Fallback PRACH Configuration Index |
|---|---|---|---|---|---|---|---|---|---|
| | | x | y | | | | | | |
| 0 | 0 | 16 | 1 | 9 | 0 | - | - | 0 | 6 |
| 1 | 0 | 8 | 1 | 9 | 0 | - | - | 0 | 6 |
| 2 | 0 | 4 | 1 | 9 | 0 | - | - | 0 | 6 |
| 3 | 0 | 2 | 0 | 9 | 0 | - | - | 0 | 6 |
| 4 | 0 | 2 | 1 | 9 | 0 | - | - | 0 | 6 |
| 5 | 0 | 2 | 0 | 4 | 0 | - | - | 0 | 6 |
| 6 | 0 | 2 | 1 | 4 | 0 | - | - | - | 5 |

```
┌─────────────────────────────────────────────────────────────────────┐
│ Receiving, from a network node serving the cell, first information  │
│ identifying first and second PRACH configurations, wherein the      │
│ second PRACH configuration is more robust against remote            │ 1610
│ interference than the first PRACH configuration; and the first      │
│ PRACH configuration is a default PRACH configuration for accessing  │
│ the cell via the PRACH.                                             │
└─────────────────────────────────────────────────────────────────────┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Performing one or more random-access attempts towards the cell       1620
  using the first PRACH configuration.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Receiving, from the network node, second information instructing      1630
  the UE to use the second PRACH configuration for subsequent
  random-access attempts towards the cell.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Performing one or more random-access attempts towards the cell       1640
  using the second PRACH configuration.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Receiving, from the network node, third information instructing       1630
  the UE to use the first PRACH configuration for subsequent
  random-access attempts towards the cell.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Performing one or more random-access attempts towards the cell       1640
  using the first PRACH configuration.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 16

IMPROVING PHYSICAL RANDOM-ACCESS CHANNEL (PRACH) ROBUSTNESS AGAINST INTERFERENCE

CROSS-REFERENCE TO RELATED APPLICATIONS

This application is a 35 U.S.C. § 371 national stage application for International Application No. PCT/SE2019/050819, entitled "IMPROVING PHYSICAL RANDOM-ACCESS CHANNEL (PRACH) ROBUSTNESS AGAINST INTERFERENCE", filed on Sep. 2, 2019, which claims the benefit of and priority to U.S. Provisional Patent Application No. 62/732,607, filed Sep. 18, 2018, the disclosures and contents of which are hereby incorporated by reference in their entireties.

TECHNICAL FIELD

The present invention generally relates to wireless (e.g., cellular) communication networks, and particularly relates to techniques that enable wireless networks to better detect wireless devices that are accessing a cell in the presence of interference.

BACKGROUND

Wireless cellular networks are built up of cells, where each cell defines a certain coverage area and is served by a radio base station (or "BS" for short). The communication between base stations and terminals/user equipment (UE) in a cell is performed wirelessly using either paired or unpaired resources in a frequency spectrum. In case of paired spectrum, the downlink (DL, i.e., BS to UE) and uplink (UL, i.e., UE to BS) communications from a single BS use separate (paired) frequency resources but can occur simultaneously, which is often referred to as Frequency Division Duplexing (FDD). In case of unpaired spectrum, the DL and UL use the same frequency resources but occur sequentially, which is often referred to as Time Division Duplexing (TDD).

In TDD arrangements, the DL and UL portions are typically separated by guard periods (GPs), which can serve several purposes. For example, the processing circuitry at the BS and UE requires sufficient time to switch between transmission and reception. Even so, this is typically a fast procedure and does not significantly contribute to a GP size/duration requirement. Typically, there is one GP at a DL-to-UL switch and another GP at a UL-to-DL switch. However, the GP at the UL-to-DL switch can generally be neglected since it only needs to give enough time to allow the BS and the UE to switch roles between reception and transmission, which is typically small.

The UL-to-DL switch GP, however, must be sufficiently large to allow a UE to receive a (time-delayed) DL grant scheduling the UL transmission, and to transmit the UL signal with proper timing advance (TA) to compensate for the propagation delay, such that it is received at the BS in alignment with the BS's timing configuration. In some cases, the GP at the UL-to-DL switch can be created with an offset to the TA. As such, the GP should be larger than two times the propagation time to the BS of a signal transmitted by a UE at the cell edge; otherwise, the UL and DL signals in the cell will interfere. Typically, GP can be chosen in direct proportion to cell size.

Furthermore, wide-area TDD radio access networks (RANs) can be planned and coordinated such that all cells use the same, or similar, nominal configurations of UL and DL periods, and are synchronized to a common time reference. In this manner, UL and DL periods start at the same time in different cells, which avoids UL-DL interference among the different cells. Examples of UL-DL interference include BS-to-BS interference (i.e., one BS transmitting DL signals in one cell interfering with another BS receiving UL signals in another cell) and UE-to-UE interference (i.e., one UE transmitting UL signals in one cell interfering with another UE receiving DL signals in another cell).

Furthermore, it can be possible and beneficial to avoid UL-DL interference by coordinating and/or synchronizing multiple TDD RANs operated by different operators. This includes RANs operating on the same frequency (e.g., in an adjacent geographic area or country), or on different frequencies (e.g., on an adjacent carrier frequency in the same geographic area). This can be done by coordinating UL and DL periods based on a common time reference such as a global navigation satellite system (e.g., GPS).

Even in a synchronized and coordinated TDD RAN, where UL and DL periods are aligned and identical in all cells, there may still be interference between uplink and downlink due to propagation delays. The effect of the delayed interfering signals can depend on the pathloss of the radio channel between the transmitter and the receiver, including the impact of the antennas. As such, one needs to also select suitable GP that not only accounts for propagation delays and synchronization errors within a single cell, but also gives sufficient protection between different cells. It can be particularly important to select suitable GP to avoid UL-DL interference between base stations, as discussed above.

FIG. 1 is a high-level diagram illustrating the effect of GP selection on mitigating and/or avoiding UL-DL interference between base stations. Two base stations (A and V) are time-synchronized but separated a distance d, corresponding to a signal propagation delay $\tau(d)$. The timing diagram shows the relative timing, at BS V's antenna, of the DL signals transmitted by both base stations. Even though both base stations cease their DL transmission at the same time, due to the propagation delay, the signal at base station V from base station A will end later. As can be seen, however, the selected GP is larger than the delay $\tau(d)$ so that BS A's DL transmission (as seen by BS V's antenna) will cease before the BS V begins UL reception.

The selection of GP size/length depends on RAN deployment parameters including transmitter power, receiver noise figure, antenna heights and down-tilt, and surrounding terrain, as well as climate conditions. For example, under normal operation, a GP duration of around 0.15 ms—offering protection from BS up to ~45 km distant—may be sufficient. Even so, the required GP can be different in different base stations in a (large) network. Nevertheless, based on (almost) worst case analysis, it can be possible to choose a single nominal GP that can be used in all RAN base stations to avoid a sufficiently high percentage of possible interference conditions.

However, climate conditions can make this more difficult. In certain regions of the world a ducting phenomenon can happen in the atmosphere during certain weather conditions. The appearance of the duct can depend on, e.g., temperature and humidity, and when the duct appears it can "channel" a radio signal such that it propagates a significantly longer distance than under normal conditions. More specifically, an atmospheric duct is a layer in which the refractivity of the lower atmosphere (e.g., the troposphere) rapidly decreases. In this way, atmospheric ducts can trap the propagating signals in the ducting layer, instead of radiating out in space.

In other words, the ducting layer acts as a wave guide in which trapped signals can propagate beyond line-of-sight (LOS) distances with relatively low path loss, e.g., even lower than in LOS propagation.

As such, when ducting is present, the increased propagation distances of signals from interfering base stations can create a need for a significantly larger DL-UL GP to avoid DL-to-UL interference. For example, to avoid remote interference from a base station at a distance 300 km, a GP of ~1 ms is needed. Although temporary, the onset and duration of ducting is unpredictable; for example, a ducting event can last from a couple of minutes to several hours.

Typically, a UE's initial access to a cell in a wireless network (e.g., a cell served by one of the BS shown in FIG. 1) is by a random-access procedure. In certain wireless networks—such as 4G and 5G networks complying with standards promulgated by 3GPP—the random-access procedure begins with the UE transmitting one or more random access preambles on a physical random access channel (PRACH) associated with the cell in which the UE is located. These preambles are also commonly referred to as "PRACH preambles."

Since the PRACH preambles are the first signal transmitted by the UE during the initial access, it is very important that they can be successfully received by the base station serving the cell, even in the presence of interference and noise. Although there are various techniques to flexibly configure PRACH preambles, these techniques do not account for the temporary occurrences of remote interference, e.g., via atmospheric ducting.

SUMMARY

Embodiments of the present disclosure provide specific improvements to communication between user equipment (UE) and network nodes in a time-division-duplexed (TDD) wireless communication network, such as by improving UE random access to cells provided by the network nodes.

Some exemplary embodiments of the present disclosure include methods and/or procedures for configuring a physical random-access channel (PRACH) of a cell in a TDD radio access network (RAN). The exemplary methods and/or procedures can be performed by a network node (e.g., base station, eNB, gNB, etc., or component thereof) in communication with user equipment (e.g., UE, wireless device, IoT device, modem, etc. or component thereof).

In some embodiments, the exemplary methods and/or procedures can include determining a first subset of available PRACH configurations based on observed characteristics of remote interference in the RAN. The first subset can be more robust against remote interference than a second subset of the available PRACH configurations, and the first subset can be exclusive of the second subset.

The exemplary methods and/or procedures can also include determining an increase in a level of remote interference in the cell. This increase can be determined in various ways, such as described herein.

The exemplary methods and/or procedures can also include selecting a first PRACH configuration from the first subset. This selection can be in response to determining the increase in the level of remote interference. In some embodiments, the first PRACH configuration can be selected to avoid time-domain PRACH occasions during the UL symbols for which the remote interference is determined to be above a predetermined threshold. In some embodiments, the first PRACH configuration can be selected from the first subset based on the size of the cell, a TDD configuration of the cell, and/or an SS/PBCH block (SSB) configuration of the cell.

The exemplary methods and/or procedures can also include transmitting, to one or more user equipment (UEs), first information indicating that the first PRACH configuration should be used for random-access attempts toward the cell. In some embodiments, the first information can include a first PRACH configuration index associated with a first random-access preamble format and a first number of valid time-domain PRACH occasions within a PRACH configuration period. In some embodiments, the first information can also indicate a first number of frequency-division multiplexed (FDM) PRACH occasions within each of the valid time-domain PRACH occasions.

In some embodiments, the exemplary methods and/or procedures can also include determining a decrease in the level of remote interference in the cell. This decrease can be determined in various ways similar and/or complementary to determining an increase, such as described herein. In such embodiments, the exemplary methods and/or procedures can also include selecting a second PRACH configuration from the second subset. This selection can be in response to determining the decrease in the level of remote interference. In such embodiments, the exemplary methods and/or procedures can also include transmitting, to one or more UEs, second information indicating that the second PRACH configuration should be used for random-access attempts toward the cell.

In some embodiments, the second information can include a second PRACH configuration index associated with a second random-access preamble format and a second number of valid time-domain PRACH occasions within the PRACH configuration period. In some embodiments, the first and second random-access preamble formats can be identical. In some embodiments, the first number of valid time-domain PRACH occasions can be less than the second number of valid time-domain PRACH occasions.

In some embodiments, within a particular uplink (UL) subframe, an earliest valid time-domain PRACH occasion associated with the first PRACH configuration index can occur later than an earliest valid time-domain PRACH occasion associated with the second PRACH configuration index. In some embodiments, the time-domain PRACH occasions associated with the first PRACH configuration index can be a subset of the time-domain PRACH occasions associated with the second PRACH configuration index.

In some embodiments, the second information can also indicate a second number of FDM PRACH occasions within each of the time-domain PRACH occasions. In such embodiments, the first number of FDM PRACH occasions, within each time-domain PRACH occasion, can be greater than the second number of FDM PRACH occasions.

Other exemplary embodiments include methods and/or procedures for configuring access to a cell in a time-division-duplexed (TDD) radio access network (RAN) via a physical random-access channel (PRACH). These exemplary methods and/or procedures can be performed by a user equipment (e.g., UE, wireless device, IoT device, modem, etc. or component thereof) in communication with a network node (e.g., base station, eNB, gNB, etc., or component thereof).

These exemplary methods and/or procedures can include receiving, from the network node serving the cell, first information indicating that a first PRACH configuration should be used for accessing the cell via the PRACH. The first PRACH configuration can be one of a first subset of available PRACH configurations, which can be more robust against remote interference than a second subset of the available PRACH configurations. The first subset can be exclusive of the second subset.

In some embodiments, the first information can include a first PRACH configuration index associated with a first random-access preamble format and a first number of valid time-domain PRACH occasions within a PRACH configuration period. In some embodiments, the first information can also indicate a first number of frequency-division multiplexed (FDM) PRACH occasions within each of the time-domain PRACH occasions.

In some embodiments, the exemplary methods and/or procedures can also include performing one or more random-access attempts towards the cell using the first PRACH configuration. For example, the one or more random-access attempts can be performed after and/or in response to receiving the first information.

The exemplary methods and/or procedures can also include receiving, from the network node, second information indicating that a second PRACH configuration should be used for random-access attempts toward the cell, wherein the second PRACH configuration is one of the second subset. In some embodiments, the second information can include a second PRACH configuration index associated with a second random-access preamble format and a second number of valid time-domain PRACH occasions within a PRACH configuration period.

In some embodiments, the first and second random-access preamble formats can be identical. In some embodiments, the first number of time-domain PRACH occasions can be less than the second number of time-domain PRACH occasions. In some embodiments, the time-domain PRACH occasions associated with the first PRACH configuration index can be a subset of the time-domain PRACH occasions associated with the second PRACH configuration index.

In some embodiments, the second information can also indicate a second number of frequency-division multiplexed (FDM) PRACH occasions within each of the valid time-domain PRACH occasions. In such embodiments, the first number of FDM PRACH occasions, within each valid time-domain PRACH occasion, can be greater than the second number of FDM PRACH occasions.

In some embodiments, within a particular uplink (UL) subframe, an initial time-domain PRACH occasion associated with the first PRACH configuration index can occur later than an initial time-domain PRACH occasion associated with the second PRACH configuration index.

In some embodiments, the exemplary methods and/or procedures can also include performing one or more random-access attempts towards the cell using the second PRACH configuration. For example, performing these random-access attempts can be in response to receiving the second information.

Other exemplary embodiments include network nodes (e.g., radio base station(s), eNBs, gNBs, CU/DU, controllers, etc.) or user equipment (e.g., UE, wireless devices, IoT devices, or components thereof, such as a modem) configured to perform operations corresponding to any of the exemplary methods and/or procedures described herein. Other exemplary embodiments include non-transitory, computer-readable media storing program instructions that, when executed by processing circuitry, configure such network nodes or such UEs to perform operations corresponding to any of the exemplary methods and/or procedures described herein.

These and other objects, features and advantages of the present disclosure will become apparent upon reading the following Detailed Description in view of the Drawings briefly described below.

BRIEF DESCRIPTION OF THE DRAWINGS

FIG. 5 shows an exemplary ASN.1 data structure for a TDD-UL-DL-Config Common information element (IE) in the NR radio resource control (RRC) protocol.

FIG. 9A shows an exemplary portion of a legacy PRACH configuration table (associated with preamble format B4) usable with unpaired spectrum in frequency range FR1 (e.g., below 6 GHZ), according to one or more exemplary embodiments of the present disclosure.

FIG. 16 shows a flow diagram of another exemplary method and/or procedure performed by a UE, according to various exemplary embodiments of the present disclosure.

DETAILED DESCRIPTION

Figure 1:
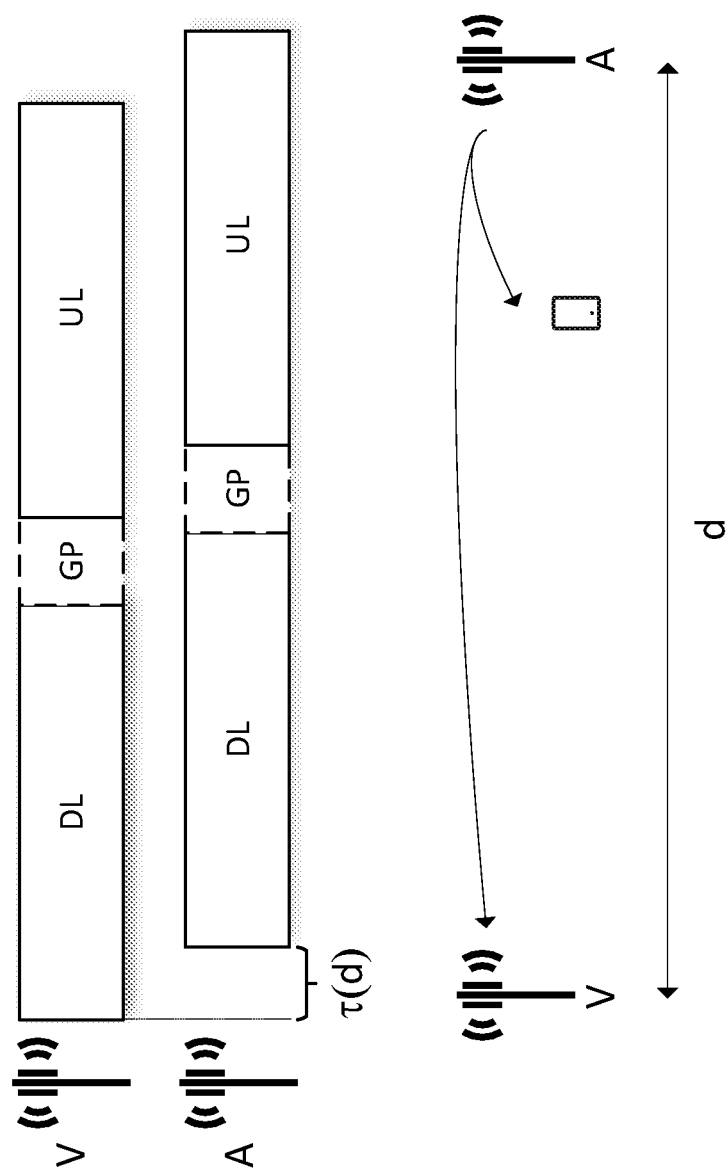
FIG. 1 is a high-level diagram illustrating the effect of GP selection on mitigating and/or avoiding UL-DL interference between base stations.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, although there are various techniques to flexibly configure PRACH preambles, these techniques do not account for the temporary occurrences of remote interference, e.g., via atmospheric ducting. This introduces various issues and/or problems, which are discussed in more detail below.

Long Term Evolution (LTE) is an umbrella term for so-called fourth generation (4G) radio access technologies (RATs) developed within the Third-Generation Partnership Project (3GPP) and initially standardized in Releases 8 and 9. The radio access network portion of LTE is also known as Evolved UTRAN (E-UTRAN), and was initially targeted at various licensed frequency bands. The LTE E-UTRAN is accompanied by improvements to non-radio aspects commonly referred to as System Architecture Evolution (SAE), which includes an Evolved Packet Core (EPC) network. LTE has continued to evolve through subsequent releases to include many advanced features.

Figure 2A:
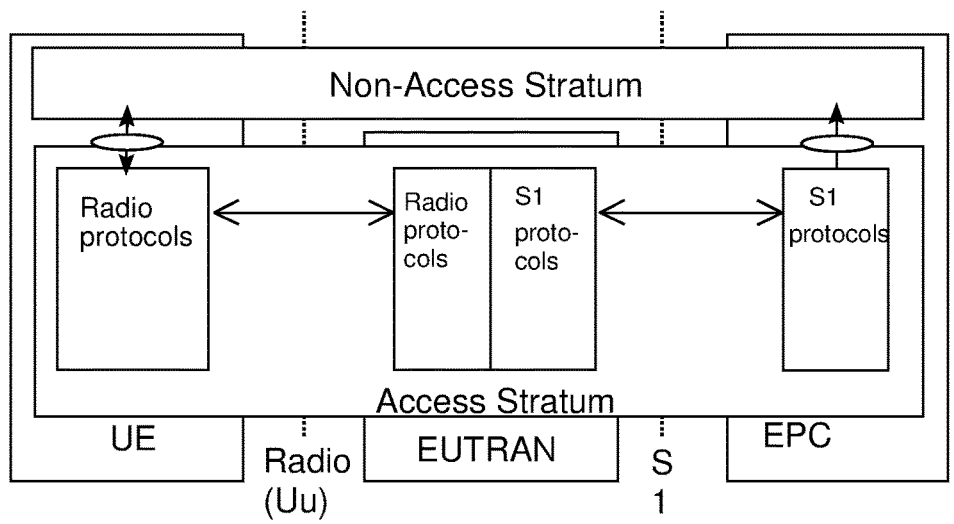
FIG. 2A is a high-level block diagram of an exemplary E-UTRAN architecture in terms of its constituent components, protocols, and interfaces.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (UP) and control plane (CP) protocol functionality. On the Uu interface, UP carries user information (e.g., data packets) while CP carries control information between UE and E-UTRAN.

Figure 2B:
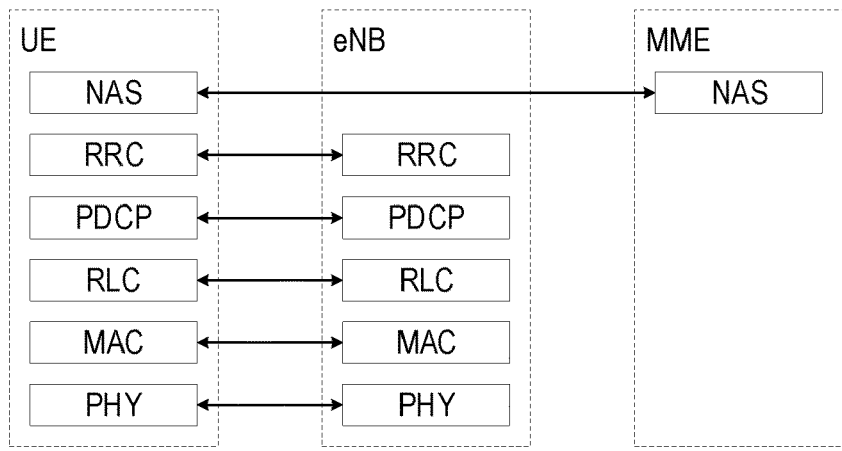
FIG. 2B is a block diagram of exemplary protocol layers of the control-plane portion of the radio (Uu) interface between a user equipment (UE) and the E-UTRAN.

FIG. 2B illustrates a block diagram of an exemplary CP protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both UP and CP. The PDCP layer provides ciphering/deciphering and integrity protection for both UP and CP, as well as other UP functions such as header compression.

Figure 2C:
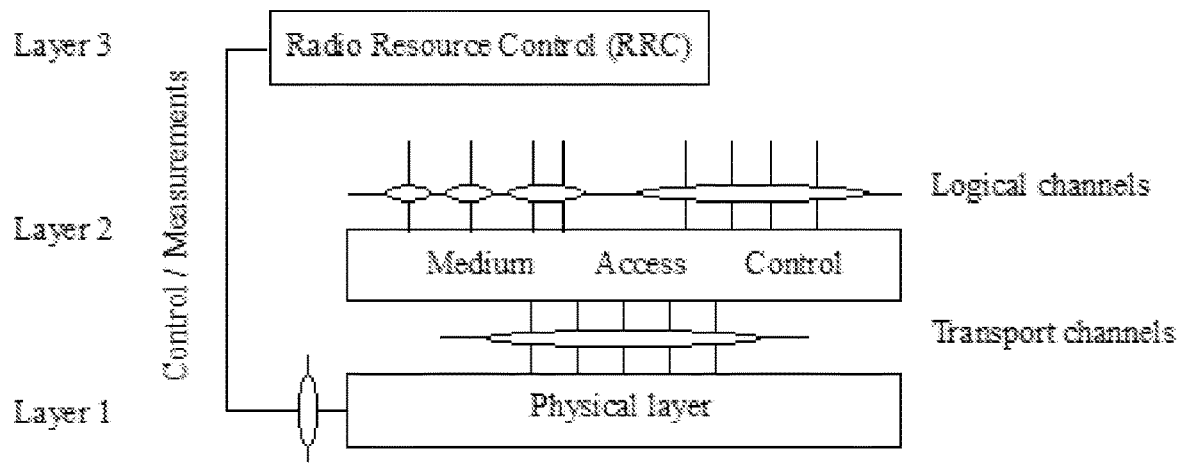
FIG. 2C is a block diagram of an exemplary LTE radio interface protocol architecture from the perspective of the PHY layer.
Figure 3A:
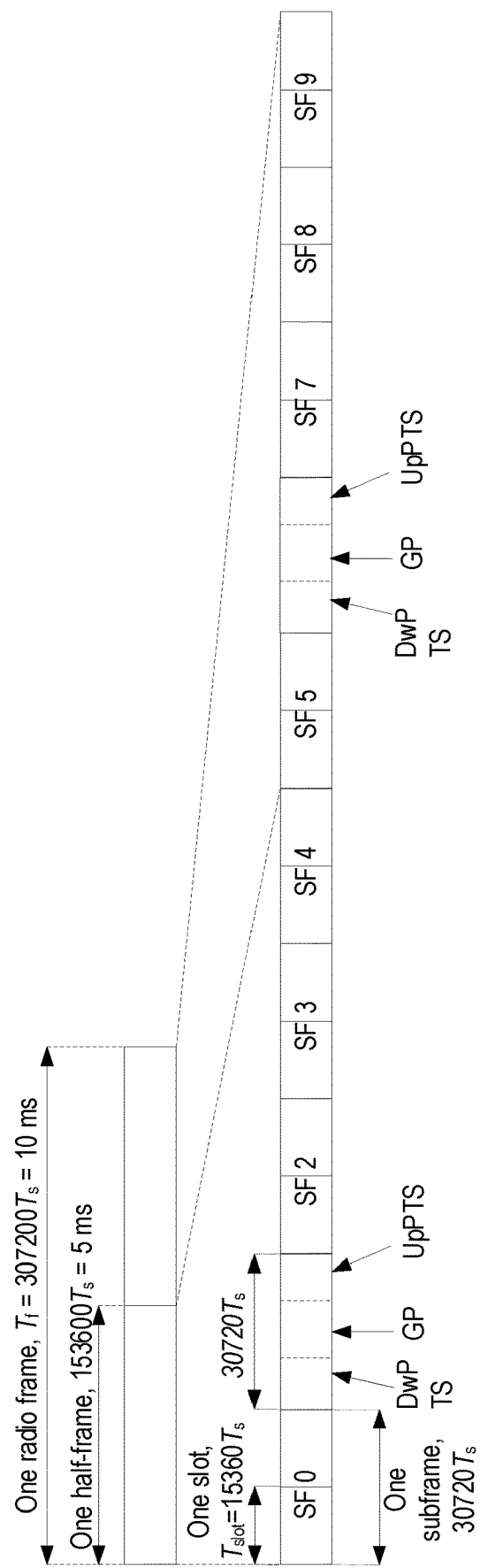
FIGS. 3A and 3B illustrate an exemplary radio frame and an exemplary downlink slot resource grid, respectively, for LTE time-division duplexing (TDD) operation.
Figure 3B:
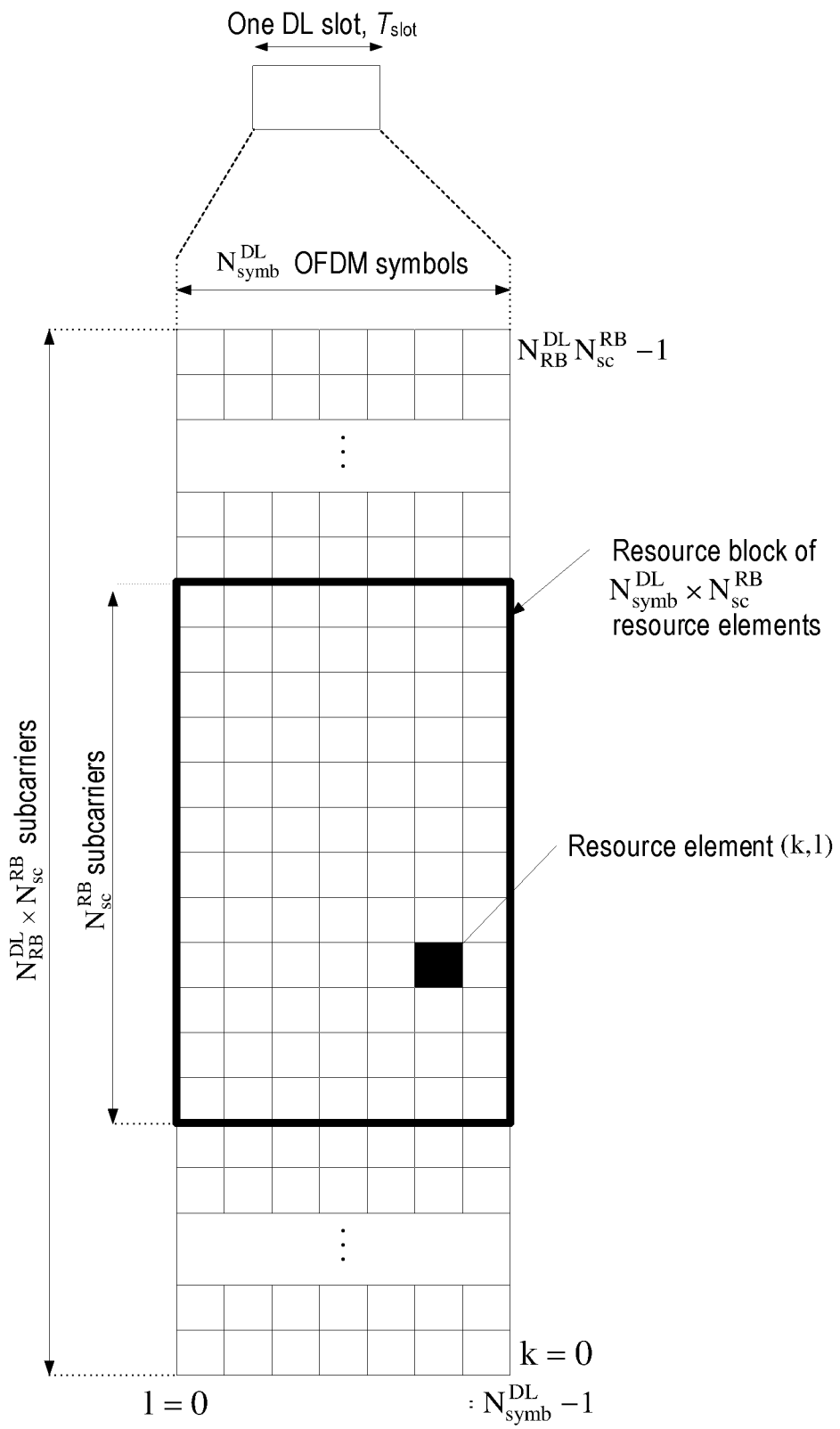

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel PUSCH is the uplink counterpart to the PDSCH. PUCCH is used by UEs to transmit uplink control information, including HARQ acknowledgements, channel state information reports, etc. PRACH is used for random access preamble transmission when a UE is accessing a cell, as briefly mentioned above and explained in more detail below.

Figure 4A:
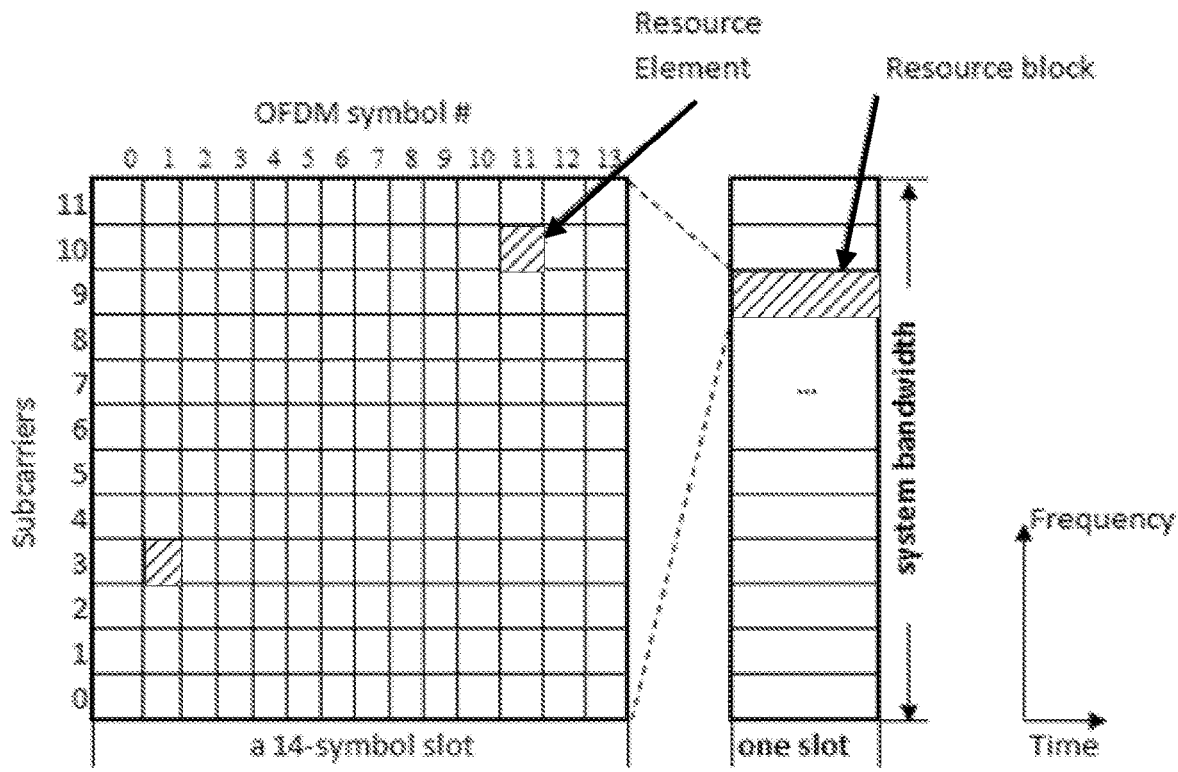
FIGS. 4A-4D illustrate various configurations of slots usable for 5G "New Radio" (NR) operation.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 4A illustrates an exemplary radio frame structure ("type 2") used for LTE TDD operation, while FIG. 4B shows an exemplary resource grid of a downlink (DL) slot used within the TDD radio frame (the resource grid for an UL TDD slot has a similar structure).

The TDD radio frame structure shown in FIG. 4A has a fixed duration of 10 ms and consists of 10 subframes, labeled 0 through 9, each subframe of 1-ms duration and comprising two 0.5-ms slots. As shown in FIG. 4B, each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

Figure 4B:
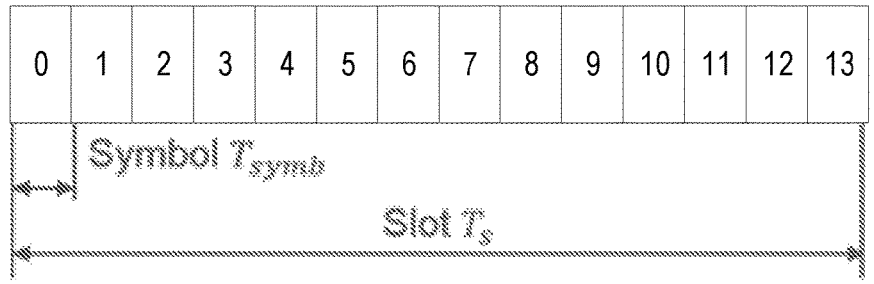

As shown in FIG. 4B, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP TS 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

The LTE PHY maps the various DL and UL physical channels to the respective resource grids. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which includes a plurality of REs.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Similar to LTE, NR uses OFDM in the downlink. Each NR radio frame is 10 ms in duration and is composed of 10 subframes having equal durations of 1 ms each. Each subframe consists of one or more slots, and each slot consists of 14 (for normal cyclic prefix) or 12 (for extended cyclic prefix) time-domain symbols.

FIG. 4A shows an exemplary time-frequency resource grid for an NR slot. As illustrated in FIG. 4A, a resource block (RB) consists of 12 contiguous, or consecutive, sub-carriers in the frequency domain. In this example, the RB spans 14 symbols in the time domain for a duration of a 14-symbol slot, but in other examples may span a different number of symbols. Like in LTE, a resource element (RE) consists of one subcarrier in the frequency domain and one symbol in the time domain. Common RBs (CRBs) are numbered from 0 to the end of the system bandwidth. Each carrier bandwidth part (BWP) configured for a UE has a common reference of CRB 0, such that a particular config-ured BWP may start at a CRB greater than zero. In this manner, a UE can be configured with a narrow BWP (e.g., 12 MHz) and a wide BWP (e.g., 120 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular carrier BWP. Similar to LTE, each NR resource element (RE) corresponds to one OFDM subcarrier during one OFDM symbol interval. Various subcarrier spacing (SCS) values (referred to as numerologies) are supported in NR and are given by $\Delta f=(15 \times 2^\mu)$ kHz where $\mu \in (0, 1, 2, 3, 4)$ denotes the numerology value. $\Delta f=15$ kHz is the basic (or reference) subcarrier spacing that is also used in LTE. The slot length is inversely related to subcarrier spacing or numerology according to $\frac{1}{2^\mu}$ ms. For example, there is one (1-ms) slot per subframe for $\Delta f=15$ kHz ($\mu=0$), two 0.5-ms slots per subframe for $\Delta f=30$ kHz ($\mu=1$), etc. In addition, the RB bandwidth is directly related to numerology according to $2^\mu *180$ kHz.

Table 1 below summarizes the supported NR transmission numerologies $\mu$ and associated parameters. A UE's DL and UL numerologies can be configured independently by the network, subject to UE support.

TABLE 1

| $\mu$ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.112 |
| 3 | 140 | Normal | 145 µs | 1.44 |
| 4 | 240 | Normal | 62.5 µs | 2.88 |

Figure 4C:
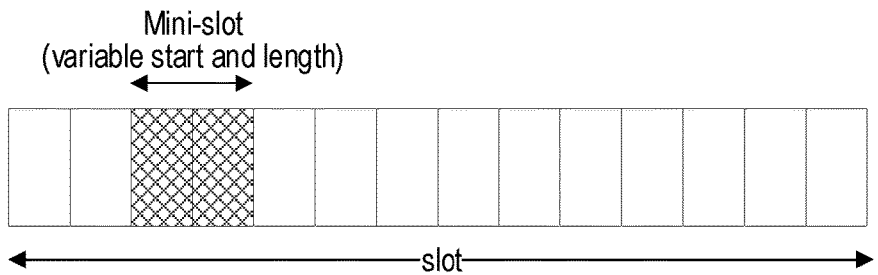

As mentioned above, an NR slot can include 14 OFDM symbols with normal cyclic prefix, and 12 OFDM symbols with extended cyclic prefix. FIG. 4B shows an exemplary NR slot configuration comprising 14 symbols, where the slot and symbol durations are denoted $T_s$ and $T_{symb}$, respectively. As also mentioned above, the NR PHY allows mini-slot transmissions. A mini-slot can include from one symbol up to one less than the number of symbols in a slot, and can start at any symbol within a slot. FIG. 4C shows an exemplary mini-slot arrangement in which the mini-slot begins in the third symbol of the slot and is two symbols in duration.

Figure 4D:
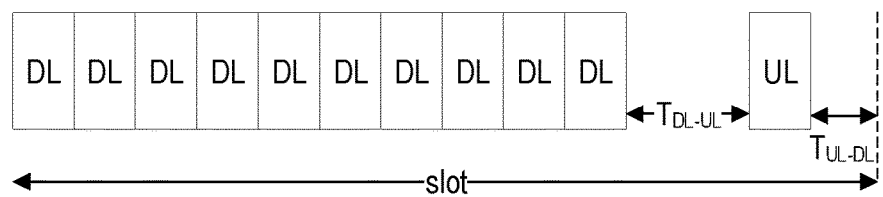

An NR slot can also be arranged with various combinations of UL and DL symbols. FIG. 4D shows an exemplary "DL-heavy" slot with one UL symbol. Moreover, this exemplary slot format includes guard periods before and after the UL symbol to facilitate change of transmission direction.

Similar to LTE, NR DL transmissions are dynamically scheduled, whereby in each slot the gNB transmits downlink control information (DCI) about which UE data is to be transmitted and the RBs in the current DL slot used to carry the data. For example, DCI formats 1_0 and 1_1 are used to convey DL grants for transmission on PDSCH. DCI is typically transmitted in the first one or two OFDM symbols in each NR slot on the PDCCH, with data carried on the PDSCH. A UE first detects and decodes PDCCH and, if successful, then decodes the corresponding PDSCH based on the DCI received via the PDCCH. Likewise, UL data transmissions are dynamically scheduled on the PUSCH via DCI transmitted on the PDCCH. DCI formats 0_0 and 0_1 are used to convey UL grants to the UE for transmission on PUSCH. In case of TDD operation, the DCI (transmitted in a DL slot) always provides a scheduling offset to PUSCH resources in a subsequent UL slot.

As noted above, certain subframes (LTE) or slots (NR) can be designated for UL transmissions, and other subframes or slots can be designated for DL transmissions. The DL-to-UL switch occurs in particular subframes or slots, referred to as special subframes (LTE) or flexible slots (NR). Table 2 below shows seven different UL-DL TDD configurations available for LTE. The size of the GP and/or the number of symbols for DwPTS (downlink transmission in a special subframe) and for UpPTS (uplink transmission in a special subframe) can also be configured from a set of available selections, defined in 3GPP TS 36.211.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

On the other hand, NR provides many different TDD UL-DL configurations. There are 10 to 320 slots per each 10-ms radio frame depending on subcarrier spacing or numerology µ. The OFDM symbols in a particular slot can be classified as downlink ("D"), flexible ("X"), or uplink ("U"). A semi-static TDD UL-DL configuration can be configured via RRC using the IE TDD-UL-DL-ConfigCommon information element (IE), which is shown in FIG. 5.

Alternatively, the TDD configuration can be dynamically indicated with a Slot Format Indicator (SFI) conveyed with DCI (e.g., Format 2_0). For both dynamic and semi-static TDD configurations, both the number of UL and DL slots and the GP (e.g., the number of UL and DL symbols in X slots) can be configured extremely flexibly within a TDD configuration periodicity.

As briefly mentioned earlier, in general, a UE determines its RB assignment in frequency domain for PUSCH or PDSCH using the resource allocation field in the detected DCI carried in PDCCH. As explained in more detail below, for PUSCH carrying Msg3 in a random-access procedure, the frequency domain resource assignment is signaled by using the UL grant contained in a random access response (RAR). In NR, two frequency resource allocation schemes, type 0 and type 1, are supported for PUSCH and PDSCH. The type to use for a PUSCH/PDSCH transmission can be defined by an RRC-configured parameter or indicated directly in the corresponding DCI or UL grant in RAR (for which type 1 is used).

Furthermore, in the context of NR, various channels are utilized for cell search and initial access including: SS/PBCH block (SSB for short), PDSCH carrying RMSI/RAR/MSG4 scheduled by PDCCH channels carrying DCI, PRACH for initial access, and PUSCH carrying Msg3. SSB also includes the signals PSS, SSS and PBCH demodulation reference signals (DMRS), along with PBCH. SSB may have 15 kHz, 30 kHz, 120 kHz or 240 kHz SCS depending on the frequency range.

Figure 6:
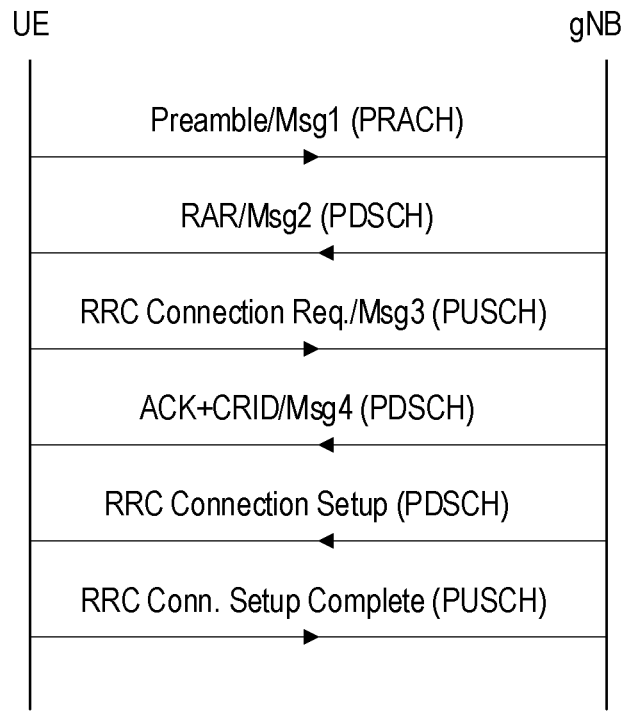
FIG. 6 shows a signal flow diagram for an exemplary successful random-access (RA) procedure between a UE and an NR gNB.

The PRACH is used by the UE to transmit a random-access (RA) preamble(s) during an initial access procedure towards a cell, and to assist the network (i.e., the NR gNB serving the cell) to adjust the uplink timing of the UE. FIG. 6 shows a signal flow diagram of an exemplary successful initial access procedure between a UE and an NR gNB. If the initial transmission of the RA preamble (also referred to as "Msg1") is successfully received, the gNB replies with a random-access response (RAR) message (also referred to as "Msg2") sent via the PDSCH. Msg3 includes a grant of UL (e.g., PUSCH) resources for sending a response. If the UE successfully receives the RAR, it replies with an RRC Connection Request message (also referred to as "Msg3") using the granted PUSCH resources. If the gNB successfully receives Msg3, it response with an acknowledgement and a contention-resolution identifier (CRID) (collectively referred to as "Msg4") to be used by the UE. In addition, the gNB also sends an RRC Connection Setup message to the UE. Subsequently, the UE responses with an RRC Connection Setup Complete message, which indicates that the UE has successfully established an RRC connection to be used for transmitting and receiving other signaling messages.

Figure 7:
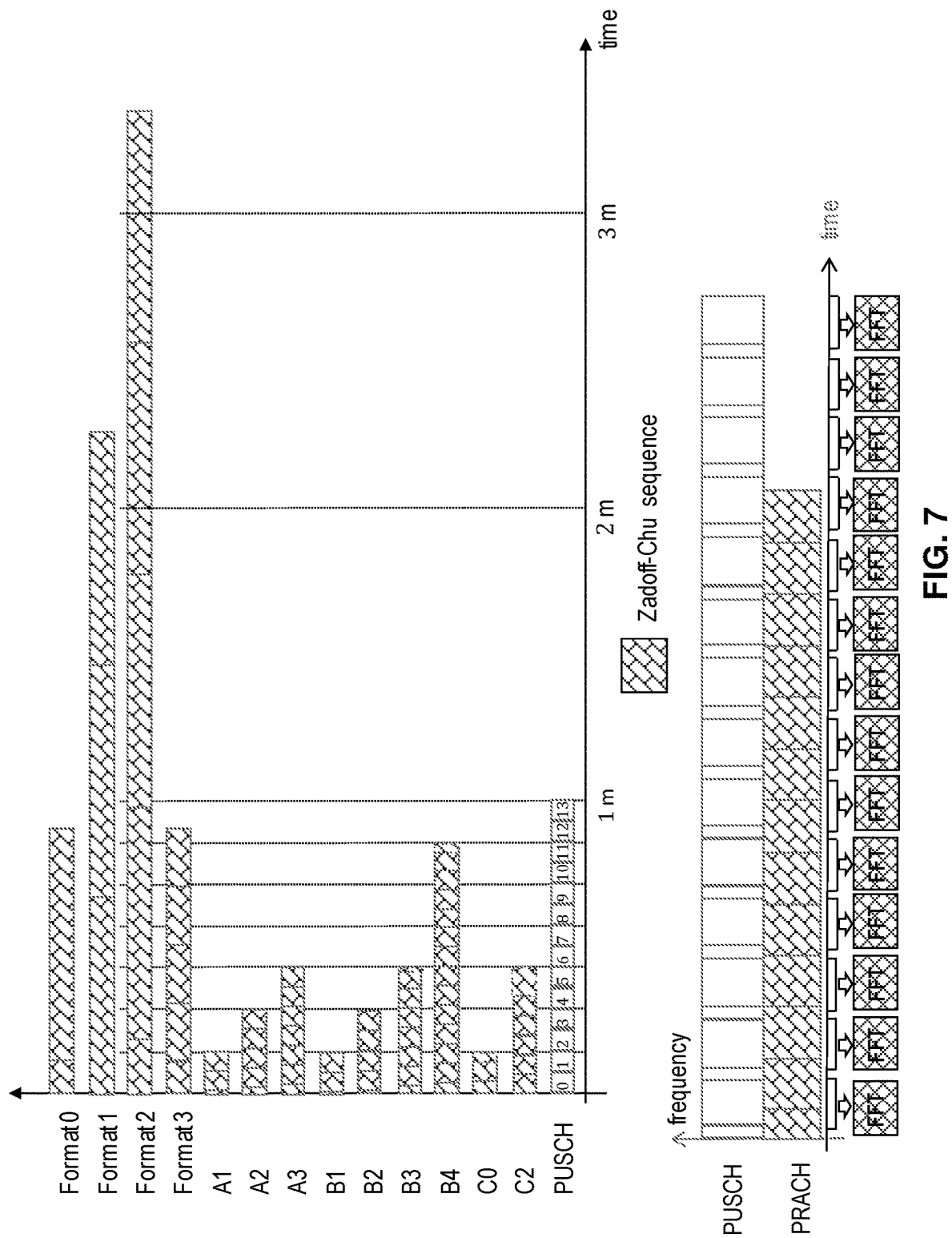
FIG. 7 shows various RA preambles supported in NR.

Like in LTE, Zadoff-Chu (ZC) sequences are used for generating NR RA preambles due to their favorable properties, including constant amplitude before and after DFT operation, zero cyclic autocorrelation, and low cross-correlation. FIG. 7 illustrates various RA preambles supported in NR, which are intended to facilitate wide range of NR deployments. For the long ZC sequence of length 839, four preamble formats (designated 0-3) that originated from the LTE are supported, mainly targeting large cell deployment scenarios. These formats can only be used in FR1 spectrum (e.g., below 6 GHz) and have a subcarrier spacing of 1.25 or 5 kHz.

For the short ZC sequence of length 139, nine different preamble formats are introduced in NR, mainly targeting the small/normal cell and indoor deployment scenarios. The short preamble formats can be used in FR1 spectrum with subcarrier spacing of 15 or 30 kHz and in FR2 spectrum (e.g., over 6 GHz) with subcarrier spacing of 60 or 120 kHz. These preambles are configured such that the last part of each OFDM symbol acts as a cyclic prefix (CP) for the next OFDM symbol. In contrast to LTE and NR long sequences, the length of a short-preamble OFDM symbol equals the length of data OFDM symbols. This design allows the gNB receiver to use the same fast Fourier transform (FFT) for data and random-access preamble detection. In addition, due to the composition of multiple shorter OFDM symbols per PRACH preamble, the new short preamble formats are more robust against time varying channels and frequency errors.

Since the PRACH preamble is the first UL signal that is transmitted during the initial access procedure shown in FIG. 6, it is very important that the PRACH preamble can be successfully received by the gNB in the presence of interference and noise. Although the sequences and other parameters of the NR PRACH can be configured flexibly, currently available configurations do not take into account the temporary occurrences of remote interference, such as via atmospheric ducting.

In NR, the time and frequency resources on which a PRACH preamble is transmitted are referred to as a "PRACH occasion." In addition, "PRACH configuration" can be used to refer to one or more PRACH occasions, a particular preamble format, and a sub-carrier spacing used to transmit the preamble. The time resources and preamble format for a PRACH configuration can be configured based on a PRACH configuration index (e.g., prach-ConfigurationIndex parameter), which points to a row in a PRACH configuration table specified in 3GPP TS 38.211 Tables 6.3.3.2-2, 6.3.3.2-3, and 6.3.3.2-4 that correspond to FR1 paired, FR1 unpaired, and FR2 unpaired spectrum, respectively. Table 3 below provides exemplary portions of Table 6.3.3.2-3 (FR1 unpaired) relating to the PRACH configurations for preamble format 0.

In Table 3, the value of "x" indicates the PRACH configuration period in number of system frames, while the value of "y" indicates the system frame within each PRACH configuration period during which PRACH occasions are configured. For instance, if y=0, then, PRACH occasions are only configured in the first frame of each PRACH configuration period. The values of "subframe number" indicate which subframes (within the frame indicated by "y") are configured with PRACH occasions, while the values of "starting symbol" indicate that initial symbol for PRACH occasions within those subframes. Since the format-0 RA preamble has a duration of nearly an entire 1-ms subframe, the number of PRACH slots per subframe parameter and the number of time-domain PRACH occasions within a slot parameter are irrelevant for the configurations shown in Table 3.

Figure 8:
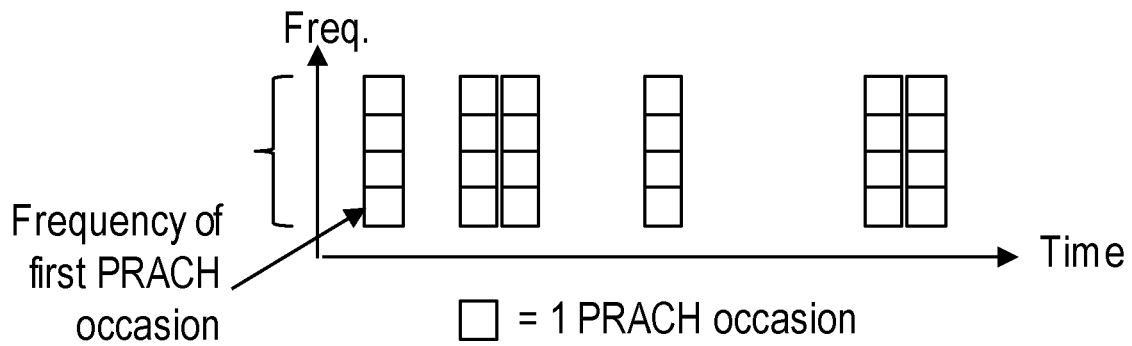
FIG. 8 shows an exemplary scenario in which four physical random-access channel (PRACH) occasions are frequency-multiplexed in a single time-domain PRACH occasion.

Furthermore, NR supports multiple frequency-division multiplexed (FDM) PRACH occasions during each time-domain PRACH occasion. This is mainly motivated by the support of analog beam sweeping in NR such that the PRACH occasions associated to one SSB are configured at the same time instance but different locations. The number of FDM PRACH occasions during one time-domain PRACH occasion can be 1, 2, 4, or 8. FIG. 8 shows an exemplary scenario in which four PRACH occasions are frequency-division multiplexed in a single time-domain PRACH occasion. Both the starting frequency and the degree of FDM can be indicated by parameters (e.g., msg1-FrequencyStart and msg1-FDMsent) from the network to the UE.

it does not precede or collide with an SSB in the RACH slot and it is at least N symbols after both the DL part and the last symbol of an SSB. Note that N can be 0 or 2 depending on PRACH format and subcarrier spacing.

As discussed above, remote interference from a DL signal transmitted by an aggressor node (e.g., gNB) can affect the detection of an UL signal from a UE at the victim node. Since the PRACH preamble is the first UL signal that is transmitted during the initial access procedure shown in FIG. 6, it is very important that the PRACH preamble can be successfully detected by the gNB in the presence of interference and noise, including such remote interference. In wide-area deployments of LTE TDD, the GP was selected to mitigate inter-cell interference from relative nearby cells. However, it is problematic to extend this solution to mitigate remote interference from relatively distant cells (e.g., >45 km). As illustrated in FIG. 1, the required GP duration is proportional to the distance or propagation delay of the

TABLE 3

| PRACH Config. Index | $n_{SFN} \mod x = y$ | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|
| | x | y | | | | | |
| 0 | 16 | 1 | 9 | 0 | — | — | 0 |
| 1 | 8 | 1 | 9 | 0 | — | — | 0 |
| 2 | 4 | 1 | 9 | 0 | — | — | 0 |
| 3 | 2 | 0 | 9 | 0 | — | — | 0 |
| 4 | 2 | 1 | 9 | 0 | — | — | 0 |
| 5 | 2 | 0 | 4 | 0 | — | — | 0 |
| 6 | 2 | 1 | 4 | 0 | — | — | 0 |
| 7 | 1 | 0 | 9 | 0 | — | — | 0 |
| 8 | 1 | 0 | 8 | 0 | — | — | 0 |
| 9 | 1 | 0 | 7 | 0 | — | — | 0 |
| 10 | 1 | 0 | 6 | 0 | — | — | 0 |
| 11 | 1 | 0 | 5 | 0 | — | — | 0 |
| 12 | 1 | 0 | 4 | 0 | — | — | 0 |
| 13 | 1 | 0 | 3 | 0 | — | — | 0 |
| 14 | 1 | 0 | 2 | 0 | — | — | 0 |
| 15 | 1 | 0 | 1, 6 | 0 | — | — | 0 |
| 16 | 1 | 0 | 1, 6 | 7 | — | — | 0 |
| 17 | 1 | 0 | 4, 9 | 0 | — | — | 0 |
| 18 | 1 | 0 | 3, 8 | 0 | — | — | 0 |
| 19 | 1 | 0 | 2, 7 | 0 | — | — | 0 |
| 20 | 1 | 0 | 8, 9 | 0 | — | — | 0 |
| 21 | 1 | 0 | 4, 8, 9 | 0 | — | — | 0 |
| 22 | 1 | 0 | 3, 4, 9 | 0 | — | — | 0 |
| 23 | 1 | 0 | 7, 8, 9 | 0 | — | — | 0 |
| 24 | 1 | 0 | 3, 4, 8, 9 | 0 | — | — | 0 |
| 25 | 1 | 0 | 6, 7, 8, 9 | 0 | — | — | 0 |
| 26 | 1 | 0 | 1, 4, 6, 9 | 0 | — | — | 0 |
| 27 | 1 | 0 | 1, 3, 5, 7, 9 | 0 | — | — | 0 |

In case of TDD, semi-statically configured DL parts and/or actually transmitted SSBs can override and/or invalidate some time-domain PRACH occasions that are configured based on a selection from a PRACH configuration table (e.g., Table 3 above). As specified in 3GPP TS 38.213 § 8.1, if a UE is provided a higher layer parameter tdd-UL-DL-ConfigurationCommon, or is also provided a higher layer parameter tdd-UL-DL-ConfigurationCommon2, a PRACH occasion in a PRACH slot is valid if: 1) it is within UL symbols; or 2) it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is provided in 3GPP TS 38.213 Table 8.2-2. In other words, PRACH occasions configured in an UL slot are always valid, and a PRACH occasion within an X slot is valid as long as interference source (e.g., aggressor node) to the area of the cell hosted by the victim node. For remote interference sources that are significantly distant from the victim node (e.g., 45-300 km), GP durations needed to cope with such remote interference can occupy a significant portion of a subframe.

Another LTE mitigation solution is that a BS can detect the presence of remote interference and adapt its special subframe configuration to increase the GP and transmit a Gold-sequence based reference signal (RS) in DwPTS (where eNB identifier is encoded) to identify interferer BS to the victim BS. However, this solution requires more BS measurements and coordination, which translates into higher complexity and more energy consumption.

Accordingly, exemplary embodiments of the present disclosure provide novel techniques to flexibly configure a random-access channel (e.g., PRACH) in a TDD RAN to avoid and/or mitigate the effects of remote interference when it is present, while not occupying excess time-domain resources during normal operation when remote interference is not present. Furthermore, such embodiments avoid the overhead and/or power consumption of certain existing solutions.

For example, according to some embodiments, networks nodes can configure UEs within a served cell to utilize different PRACH configurations at different times, where the particular PRACH configuration selected at any given time can depend on the presence and/or level of interference in one or more UL symbols immediately following a DL-to-UL switch in the cell's transmission direction. For example, if the network node detects the presence and/or increase in the interference in these one or more UL symbols, it can select a first PRACH configuration associated with time-domain PRACH occasions that do not occur in these one or more symbols. In other words, the network node can select a first PRACH configuration having time-domain PRACH occasions that occur during UL symbols subsequent to the one or more UL symbols in which the presence and/or increase in interference was detected. The network node can then signal the selected first PRACH configuration to one or more UEs that are served by, or located within, the cell.

In this manner, the network can select a first PRACH configuration in which the valid time-domain PRACH occasions are arranged to create additional GP for preamble transmissions. The total GP—including the normal GP during the DL-to-UL switch and the additional GP—can be configured for a typical and/or expected remote interference distance range (e.g., propagation delay), or for an actual and/or detected remote interference distance range. In either case, by configuring UEs to use the first PRACH configuration, the effect of the remote interference on the preambles transmitted on PRACH can be eliminated, minimized, and/or reduced.

The first PRACH configuration can be one of a first subset of all available PRACH configurations. For example, the available PRACH configurations can include all PRACH configurations identified by one or more legacy (e.g., existing) PRACH configuration tables understood by the network node and the UEs (e.g., Table 2 above, or Tables 6.3.3.2-2, 6.3.3.2-3, and/or 6.3.3.2-4 in 3GPP TS 38.211 v15.2.0). In such case, the network node can determine (e.g., select) the first subset of PRACH configurations based on a typical and/or expected remote interference distance range (e.g., propagation delay), or based on observed and/or measured characteristics of remote interference in the network.

The first subset can be determined according to various criteria. As an example, for each PRACH configuration comprising the first subset, the number of PRACH occasions during the UL symbols immediately following the DL-to-UL switch can be zero or less than some predetermined threshold. The first subset can be exclusive of a second subset of all available PRACH configurations, where the second subset does not meet the criteria used to select the first subset. More generally, the network node can determine (e.g., select) a plurality of subsets of available PRACH configurations, with each subset associated with a particular range of typical, expected, and/or observed remote interference propagation delays.

In some embodiments, the network node can configure the UEs to use the first PRACH configuration statically, so as to avoid remote interference during the periods when it occurs. In such cases, the configuration of the UEs to use the first PRACH configuration can be independent of any detection and/or observation, by the network node, of the presence and/or increase in remote interference in the cell.

In other embodiments, the network node can configure the one or more UEs to use different PRACH configurations dynamically according to the presence/absence, increase/decrease, and/or level of remote interference. In such cases, the selection of—and configuration of the UEs to use—the first PRACH configuration can be dependent on the detection and/or observation, by the network node, of the presence and/or increase in remote interference in the cell. Likewise, if the network node detects an absence and/or decrease in the interference in the one or more UL symbols immediately following the DL-to-UL switch, it can select a second PRACH configuration associated with time-domain PRACH occasions that occur in these one or more symbols. For example, the second PRACH configuration can be one of the second subset. The network node can then signal the selected second PRACH configuration to one or more UEs that are served by, or located within, the cell.

The operations of various exemplary embodiments are explained below with reference to FIG. 9A, which shows an exemplary portion of a legacy PRACH configuration table (associated with preamble format B4) usable with unpaired spectrum in frequency range FR1 (e.g., below 6 GHZ), and FIG. 9B, which shows a comparison of two PRACH configurations selected from the table shown in FIG. 9A. Even so, these examples are used for the purpose of illustration and explanation of operational principles and are not intended to limit the scope. In other words, the illustrated operational principles can be applied broadly (e.g., other preambles, frequency ranges, etc.) to selection of PRACH configurations to mitigate the effects of remote interference.

Figure 9B:
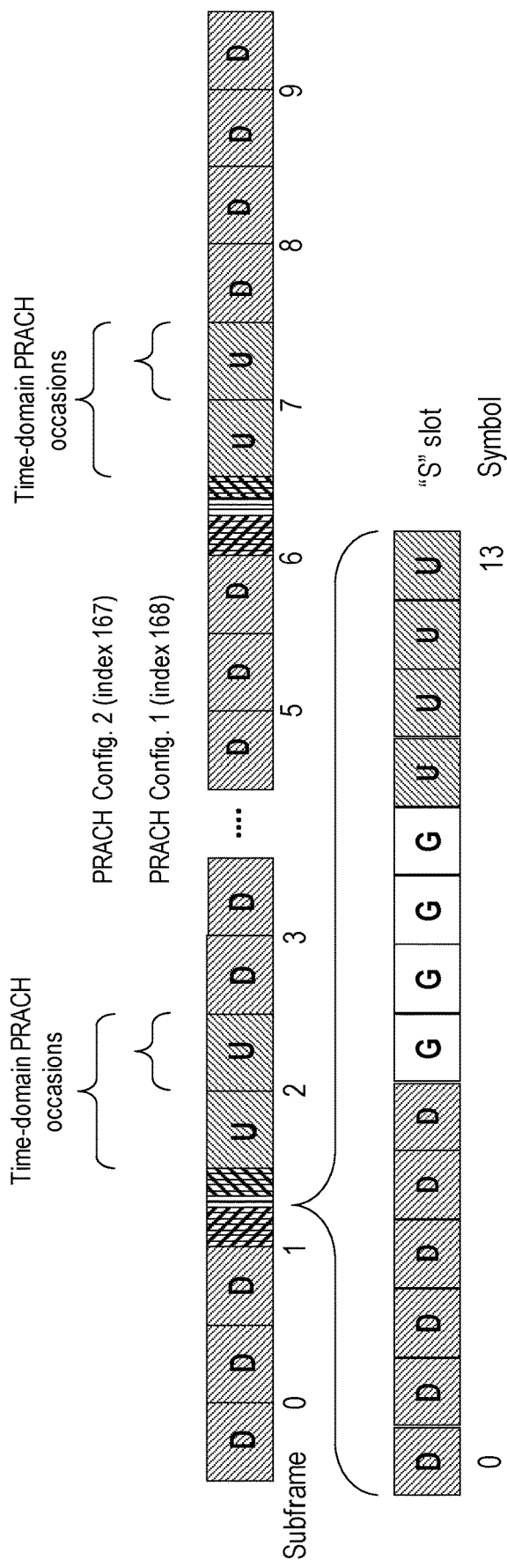
FIG. 9B shows a comparison of two PRACH configurations selected from the table shown in FIG. 9A, according to one or more exemplary embodiments of the present disclosure.

In the example shown in FIGS. 9A-B, the carrier frequency is within FR1 and the semi-static TDD configuration is DDDSUUDDDD, where D denotes a DL slot, U denotes an uplink slot, and S denotes a special slot. As shown in FIG. 9B, the S slot consists of six DL symbols (D), followed by four unknown symbols (G) forming a GP, and then four UL symbols (U). Based on a 30-kHz SCS, each slot has a duration of 0.5 ms. As noted above, preamble format B4 (see FIG. 7) is used with 30-KHz SCS and a duration of 0.415 ms. In this example, the table shown in FIG. 9A can be considered to define the available PRACH configurations.

As mentioned above, in some embodiments, the available PRACH configurations can be divided into two subsets or groups. The first subset can contain PRACH configurations that are robust against remote interference, while the second subset can contain PRACH configurations that are not robust against remote interference, or at least less robust than the PRACH configurations comprising the first subset. Even so, the selection of two subsets is merely exemplary, and the available PRACH configurations can be subdivided into a plurality of subsets, with each subset having a different level of robustness against remote interference. In some embodiments, the selection of subsets of available PRACH configurations can be based the total effective GP of the respective PRACH configurations. As briefly mentioned above, the total effective GP includes the normal GP following the last DL symbol (e.g., the four G symbols in the S slot shown in FIG. 9B) and the additional GP provided by the timing of the time-domain PRACH occasions relative to the beginning of the UL period. In other words, the total effective GP for a particular PRACH configuration includes the duration of all OFDM symbols after the last DL symbol and before the first time-domain PRACH occasion associated with that PRACH configuration. The total effective GP for each of the available PRACH configurations can be compared against a threshold delay, which can be determined and/or selected based on expected and/or observed characteristics of remote interference in the network. These observed characteristics can depend on network topology, inter-site distance, PRACH link budget, etc. As an example, the threshold delay be selected to correspond to an interference propagation delay of at least than 150 km. Accordingly, PRACH configurations providing a total effective GP corresponding to a propagation delay of at least 150 km can be selected for the first subset, and the remaining PRACH configurations can be assigned to the second subset.

As mentioned above, in some embodiments, the network node can statically configure UEs to use a particular PRACH configuration, so as to avoid remote interference during the periods when it is present or above a particular level (e.g., during atmospheric ducting). However, the UE would also use that particular PRACH configuration during periods when remote interference is absent or below the particular level. In other words, selection and use of the particular PRACH configuration can be independent of the actual occurrence of remote interference but would be robust against such interference when it does occur. In such embodiments, the network node can select the particular PRACH configuration from the first subset but refrain from selecting particular PRACH configurations from the second subset.

As an example, consider the PRACH configuration corresponding to index 168 in the table shown in FIG. 9A. The time-domain PRACH occasions association with this PRACH configuration can occur during all subframes 0-9 in each PRACH configuration period, which is every 10-ms frame (x=1). However, the valid time-domain PRACH occasions are limited to UL subframes in the particular TDD configuration, which in this case are subframes 2 and 7. Furthermore, the starting symbol of each time-domain PRACH occasion is delayed for two symbols, such the PRACH transmission starts from the third symbol of the PRACH slot.

Based on this PRACH configuration identified by index 168, the total effective GP created for PRACH transmission is enlarged from the four symbols ("G" during S slot) to also include the four U symbols of the S slot, the 14 symbols of subframe 2 slot 1, and the first two symbols of subframe 1 slots. This total effective GP of 24 symbols can mitigate and/or avoid remote interference with distance range up to ~257 km. Accordingly, this particular PRACH configuration can be part of a first subset so long as the threshold delay for determining/selecting the first subset corresponds to a distance no greater than 257 km.

In contrast, index 167 identifies a PRACH configuration in which the valid time-domain PRACH occasions include both UL slots during subframes 2 and 7 within each 10-ms frame. In addition, the starting symbol of each time-domain PRACH occasion is the first symbol of the PRACH slot. With this PRACH configuration, the total effect GP for PRACH transmission is eight symbols (i.e., the final eight symbols of the S slot), which can mitigate and/or avoid remote interference with distance range up to around 86 km.

FIG. 9B illustrates a relative comparison of PRACH occasions associated with PRACH configuration indices 167 and 168 from the table in FIG. 9A. If the threshold delay is set greater than 86 km but less than or equal to 257 km, the index-168 PRACH configuration can be selected as part of the first subset and the index-167 PRACH configuration can be assigned to the second subset.

Figure 10:
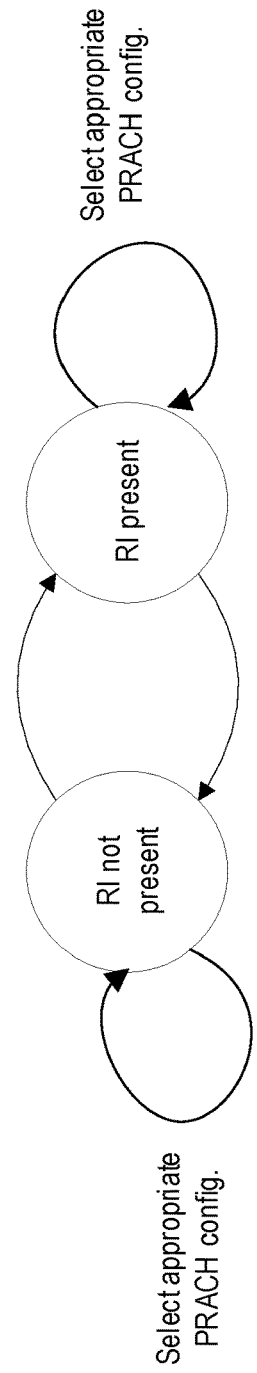
FIG. 10 shows an exemplary state diagram illustrating network-controlled transitions between first and second PRACH configurations, according to various exemplary embodiments of the present disclosure.

As mentioned above, in some embodiments, the network node can configure the one or more UEs to use different PRACH configurations dynamically according to the presence/absence, increase/decrease, and/or level of remote interference. FIG. 10 shows an exemplary state diagram illustrating network-controlled transitions between a first PRACH configuration, selected upon determining the remote interference is present, has increased, or is above a particular level, and a second PRACH configuration, selected upon determining the remote interference is absent, has decreased, or is below a particular level.

For example, the network node can detect the presence and/or increase of remote interference based on an observed increase (or rate of increase, e.g., slope) in the interference levels in one or more UL symbols immediately following a DL-to-UL switch or transition. Similarly, the network node can detect the absence and/or decrease of remote interference based on an observed decrease (or rate of decrease, e.g., slope) in the interference levels in the first UL symbols after a DL-to-UL switch.

For example, the first PRACH configuration can be selected from the first subset and the second PRACH configuration can be selected from the second subset. In some embodiments, the network node can select the first subset or the second subset according to the presence/absence, increase/decrease, and/or level of remote interference, and then select a particular PRACH configuration from the selected subset based on factors other than remote interference, including cell-specific parameters such as the maximum cell range supported by the specific PRACH configuration.

Since PRACH configurations in the first subset limit the time-domain PRACH occasions available (e.g., the first PRACH slot of UL subframes 2 and 7 is unavailable for the index-168 PRACH configuration), the initial access capacity for PRACH configurations in the first subset will be reduced as compared to PRACH configurations of the second subset. Furthermore, the maximum cell radius supported due to propagation delay will be more limited. In some embodiments, to compensate for the reduced initial access capacity, the network can configure more frequency-division-multiplexed (FDM) PRACH occasions within each time-domain PRACH occasion for PRACH configurations of the first subset, than for PRACH configurations in the second subset. Alternately, if the network node is statically configuring UEs to use a PRACH configuration from the first subset, the network node can also configure a FDM level within each time-domain PRACH occasion to maintain suitable initial access capacity.

After selecting a particular PRACH configuration, the network node can transmit the selected configuration (e.g., PRACH configuration index and/or FDM within time-domain PRACH occasions) to UEs within the cell via system information block 1 (SIB1), typically sent via PDSCH. Subsequently, non-connected UEs will receive SIB1 as part of their initial access procedure, and thus use the updated PRACH configuration in subsequent initial random-access procedures towards the cell. Alternately, or in addition, the network can use paging to instruct connected UEs read the updated SIB1.

Using the example shown in FIGS. 9A-B, the network node can select the index-168 PRACH configuration (e.g., the first PRACH configuration selected from the first subset) when it determines that remote interference is present, has increased, or is above a certain level, in the UL symbols immediately following the DL-to-UL transition in subframe 1. The network node can transmit this index to UEs, e.g., in SIB1 via the PDSCH. In some embodiments, the network node can also transmit, to the UEs, an FDM level associated with the PRACH configuration index.

Likewise, the network node can select the index-167 PRACH configuration (e.g., the second PRACH configuration selected from the second subset) when it determines that remote interference is absent, has decreased, or is below a certain level, in the UL symbols immediately following the DL-to-UL transition in subframe 1. The network node can transmit this index to UEs, e.g., in SIB1 via the PDSCH. In some embodiments, the network node can also transmit, to the UEs, an FDM level associated with the PRACH configuration index. As shown in FIG. 9B, the time-domain PRACH occasions comprising the index-168 PRACH configuration are a subset of the time-domain PRACH occasions comprising the index-167 PRACH configuration.

More generally, a plurality of subsets of available PRACH configurations can be selected, where the respective subsets are robust against remote interference with differing distance or propagation delay. For example, a first subset can be selected to include PRACH configurations which are robust against remote interference corresponding to a propagation distance less than or equal to $X_1$ km, a second subset comprise the PRACH configurations which are robust against remote interference less than or equal to $X_2$ km, a third subset comprise the PRACH configurations which are robust towards remote interference less than or equal to $X_3$ km, and so forth. In such case, $X_i > X_{i+1}$ holds for all distances associated with the subsets.

In such embodiments, the network node can determine not only the presence/absence, increase/decrease, and/or level of remote interference, but also the distribution of remote interference propagation delays. This may be done, for instance, by measuring remote interference management reference signal (RIM-RS) transmissions from aggressor network nodes, or by locally estimating the interference above thermal noise (IoT) level in each UL OFDM symbol. Based on the estimated range of remote interference, the network node can select a particular subset and a particular PRACH configuration from the selected subset (which can be based on other considerations, as discussed above).

For example, consider three subsets corresponding to $X_1$=200 km, $X_2$=120 km and $X_3$=40 km. The network node may first detect that severe remote interference is present, with propagation delays extending to 150 km. The network node then selects a PRACH configuration from the first subset (e.g., a first PRACH configuration) and transmits it to UEs within the cell. Subsequently, the network node can detect that levels of remote interference that would interfere with random-access only extend out to ~80 km. The network node then selects a PRACH configuration from the second subset (e.g., a second PRACH configuration) and transmits it to UEs within the cell. Subsequently, the network node can detect that levels of remote interference that would interfere with random-access only extend out to ~30 km. The network node then selects a PRACH configuration from the third subset (e.g., a third PRACH configuration) and transmits it to UEs within the cell. By continually adapting the PRACH configurations depending on the range of remote interference present (and/or above a particular level), the network node can balance the competing demands of PRACH capacity and robustness to remote interference.

In other embodiments of the present disclosure, a UE can utilize a first PRACH configuration for random-access during normal operation, and at least a second (e.g., fallback) PRACH configuration with improved robustness against remote interference during periods when remote interference is determined to be present and/or above a predetermined level. Various fallback PRACH configurations can be defined according to requirements and/or needs. In some embodiments, a particular fallback PRACH configuration can be selected by the network and signaled to one or more UEs in various ways. In other embodiments, a particular PRACH fallback configuration can be selected by the UE based on, e.g., failure of random-access attempts using the first PRACH configuration.

In some embodiments, a network node serving a cell can detect the presence and/or increase of remote interference in the cell based on measurements that the node performs. In some embodiments, a network node can detect the presence and/or increase of remote interference indirectly based on information received from one or more UEs that it serves. For example, such information can include random-access preambles transmitted according to a PRACH configuration associated with the presence and/or increased level of remote interference.

In some exemplary embodiments, at least a second (e.g., fallback) PRACH configuration can be signaled to UEs by a new set of parameters added to System Information Block 1 (SIB1) that is currently transmitted in a broadcast manner on PDSCH. For example, this new set of parameters can be originated from a subset of the PRACH configuration parameters that are already contained in RACH-Config-Common information element (IE) specified in 3GPP TS 38.331 for NR Rel-15. In further detail, a new parameter prach-ConfigurationIndex-RIM can be included in SIB1 to indicate the time-domain PRACH occasions and the preamble format corresponding to a fallback PRACH configuration.

The parameter prach-ConfigurationIndex-RIM can indicate the time-domain PRACH occasions and the preamble format corresponding to a fallback PRACH configuration in various ways. There are different ways for signaling the new parameter. In some embodiments, prach-ConfigurationIndex-RIM can use the same number of bits (e.g., eight bits) as the parameter prach-ConfigurationIndex, that is currently used to indicate the PRACH configuration for normal operation. Similar to parameter prach-ConfigurationIndex, prach-ConfigurationIndex-RIM can indicate (e.g., point to) a row of an existing (e.g., legacy) PRACH configuration table, such as the tables discussed above. In such case, the remainder of the PRACH configuration parameters (e.g., msg1-SubcarrierSpacing and prach-RootSequenceIndex) can be shared the first (e.g., normal) PRACH configuration and the second (e.g., fallback) PRACH configuration.

In other embodiments, prach-ConfigurationIndex-RIM can comprise fewer bits than the existing parameter prach-ConfigurationIndex. In such case, prach-ConfigurationIndex-RIM can indicate (e.g., point to) a row of a new PRACH configuration table that can be, e.g., a subset of the corresponding legacy PRACH configuration table. For example, the subset comprising the new PRACH configuration table can be the rows that correspond to a selected preamble format, a group of configurations that are robust against remote interference, etc.

In other embodiments, prach-ConfigurationIndex-RIM can comprise more bits than the existing parameter prach-ConfigurationIndex. In such case, prach-ConfigurationIndex-RIM can indicate (e.g., point to) a row of a new PRACH configuration table that can be, e.g., a superset of the corresponding legacy PRACH configuration table. For example, the new PRACH configuration table can comprise all or a portion of the legacy PRACH configuration table and additional PRACH configurations that are robust against remote interference. As a more specific example, the new PRACH configuration table can comprise the legacy PRACH configuration table and a second PRACH configuration table with (e.g., more robust) PRACH configurations not included in the legacy PRACH configuration table. As such, prach-ConfigurationIndex-RIM can indicate (e.g., point to) an entry from either the legacy PRACH configuration table or the second PRACH configuration table.

In still other embodiments, a fixed fallback PRACH configuration can be associated with (e.g., specified for) each preamble format, such as the preamble formats shown in FIG. 7. This fixed fallback PRACH configuration can be an existing PRACH configuration (e.g., identified in a legacy PRACH configuration table) associated with a particular preamble format, or a new PRACH configuration that is not associated with the particular preamble format. When a UE determines to switch to the fallback PRACH configuration, it uses the same preamble format as for normal operation but reinterprets the valid PRACH occasions according to the associated fallback PRACH configuration.

Figures 11, 12:
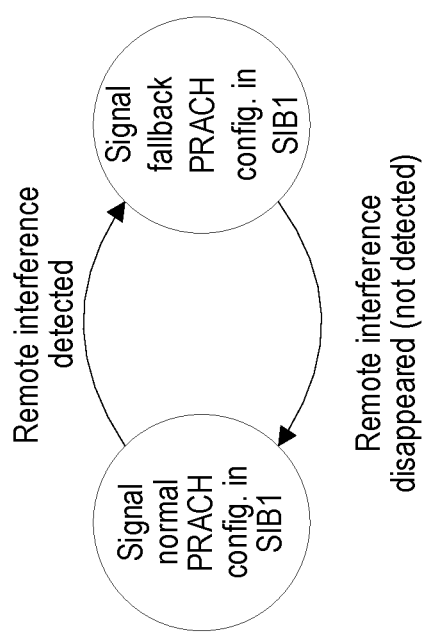
FIG. 11 shows an exemplary portion of a PRACH configuration table for preamble format 0, including a column for fallback PRACH configuration, according to various exemplary embodiments of the present disclosure.
FIG. 12 shows an exemplary state diagram illustrating network-controlled transitions between normal and fallback PRACH configurations, according to various exemplary embodiments of the present disclosure.

In still other embodiments, a fixed fallback PRACH configuration can be associated with (e.g., specified for) each existing PRACH configuration index. In such case, once a UE knows its first (e.g., normal) PRACH configuration, it will also know its second (e.g., fallback) configuration. In this manner, prach-ConfigurationIndex signals the second (e.g., fallback) configuration such that no additional bits are needed. For example, the fallback PRACH configuration associated with each PRACH configuration index can be added as an additional column to each of the legacy PRACH configuration tables. FIG. 11 shows an exemplary portion of the legacy PRACH configuration table for preamble format 0, with an additional column for fallback PRACH configuration. Each entry in this right-most column contains an index pointing to a particular row of the table that identifies the fallback PRACH configuration. For example, the table entry associated with PRACH configuration index 0 identifies the table entry associated with PRACH configuration index 6 as the associated fallback PRACH configuration.

In still other embodiments, a fallback PRACH configuration can be identified according to a new PRACH occasion invalidation rule. In other words, a first PRACH occasion invalidation rule can be used to invalidate PRACH occasions during normal operation, and a second (e.g., fallback) PRACH occasion invalidation rule can be used to invalidate PRACH occasions during periods when remote interference is determined to be present. For example, the first rule can identify a PRACH occasion as valid if it is at least N1 symbols after the last DL symbol and at least N1 symbols after a last SSB transmission symbol, and the second rule can identify a PRACH occasion as valid if it is at least N2 symbols after the last DL symbol and at least N2 symbols after a last SSB transmission symbol. For example, a smaller N1 can be selected based on propagation delays during normal (e.g., local) interference conditions, and a larger N2 can be selected based on propagation delays associated with remote interference. Accordingly, the second rule can invalidate more PRACH occasions than the first rule, thereby restricting PRACH transmission during periods of remote interference to more robust PRACH occasions.

As mentioned above, in some embodiments the UE can determine whether to use a first (e.g., normal) PRACH configuration or a second (e.g., fallback) PRACH configuration. This can be done in various ways. In some embodiments, the UE can determine to switch to the second, more robust PRACH configuration after failing a predetermined number of times to detect a RAR (Msg2) responsive to preamble transmissions. In other embodiments, the UE can determine to switch to the second, more robust PRACH configuration after a maximum number of unsuccessful random-access attempts have been performed. Note that a random-access attempt can be deemed unsuccessful for various reasons including failure to detect and/or receive Msg 2, failure to detect and/or receive Msg4, etc. In a similar manner, the UE can determine to switch back to the first, less robust PRACH configuration after a predetermined duration, a successful RA attempt, etc.

In other embodiments, a network node (e.g., gNB) can determine whether served UEs (e.g., UEs in a cell served by the gNB) should use a first (e.g., normal) PRACH configuration or a second (e.g., fallback) PRACH configuration, and signal that determination to the UEs in various ways. For example, the network node can detect the presence and/or increase of remote interference based on an observed increase (or rate of increase, e.g., slope) in the interference levels in one or more UL symbols immediately following a DL-to-UL switch or transition. Similarly, the network node can detect the disappearance and/or decrease of remote interference based on an observed decrease (or rate of decrease, e.g., slope) in the interference levels in the first UL symbols after a DL-to-UL switch.

In response, the network node can signal the UEs to switch from (to) the first PRACH configuration to (from) the second PRACH configuration. In some embodiments, the gNB can signal which of the PRACH configurations to use based on the value of a bit transmitted in the master information block (MIB) via the PBCH. Alternately, the network node can signal which of the PRACH configurations to use based on the value of a bit transmitted in SIB1 via the PDSCH. If multiple fallback configurations are available (corresponding, e.g., to different remote interference propagation delays), multiple bits can be used to identify which PRACH configuration to use. FIG. 12 shows an exemplary state diagram illustrating network-controlled transitions between normal and fallback PRACH configurations.

The network node's determination of the presence and/or increase of remote interference can also be based on transmissions from one or more UEs. For example, according to certain embodiments described above, a UE can be capable of selecting a fallback PRACH configuration based on, e.g., various random-access failures. If the fallback PRACH configuration uses a different preamble format than the normal PRACH configuration, by detecting a preamble transmitted according to the fallback PRACH configuration, the network nodes can determine the presence and/or increase of remote interference. Similarly, if the fallback PRACH configuration uses different PRACH occasions than the normal PRACH configuration, by detecting a preamble transmitted during PRACH occasions according to the fallback PRACH configuration, the network node can determine the presence and/or increase of remote interference. Differences between other PRACH configuration parameters (e.g. subcarrier spacing) can also be utilized advantageously in this manner.

Figure 13:
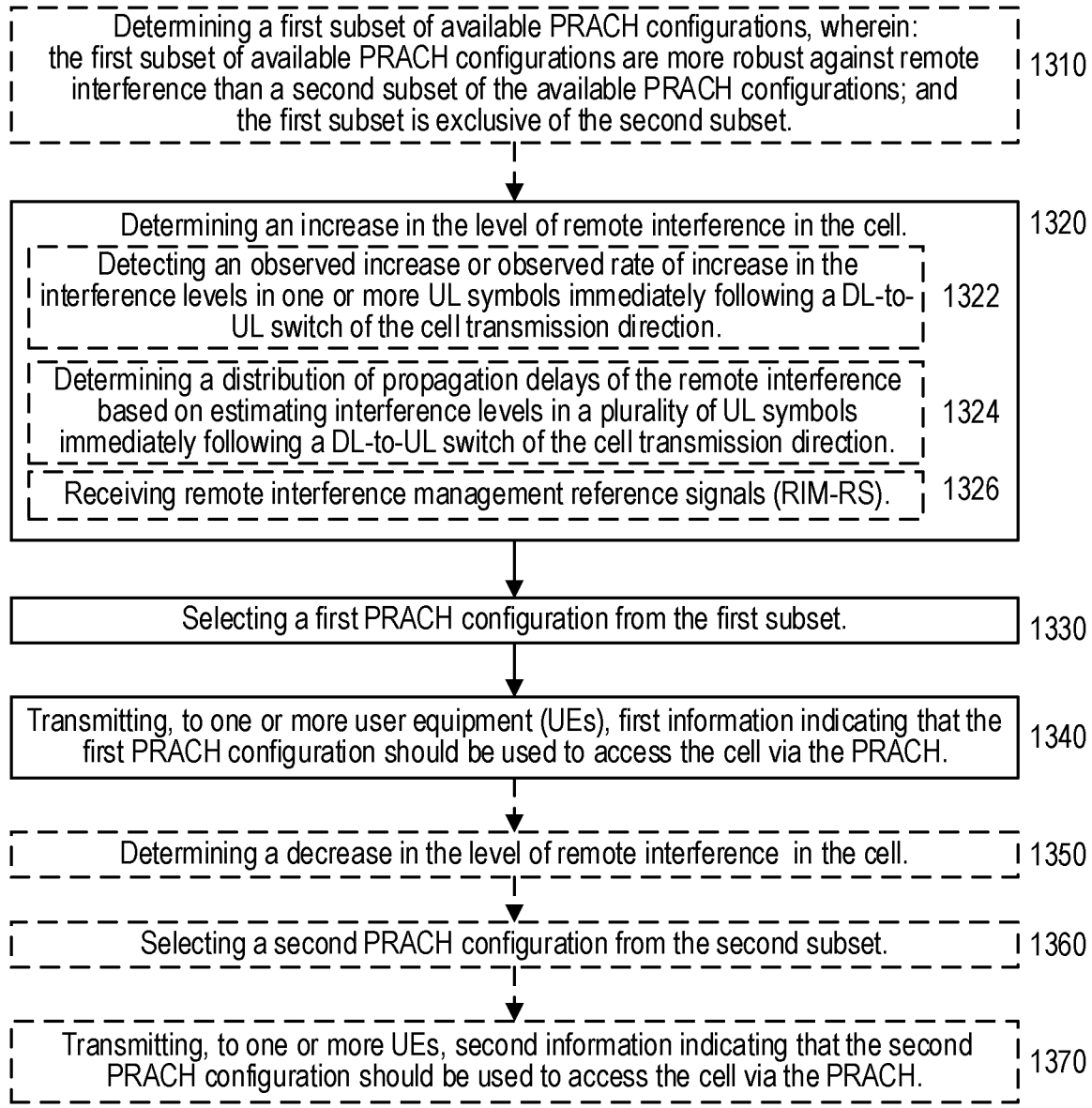
FIG. 13 shows a flow diagram of an exemplary method and/or procedure performed by a network node in a radio access network (RAN), according to various exemplary embodiments of the present disclosure.
Figure 14:
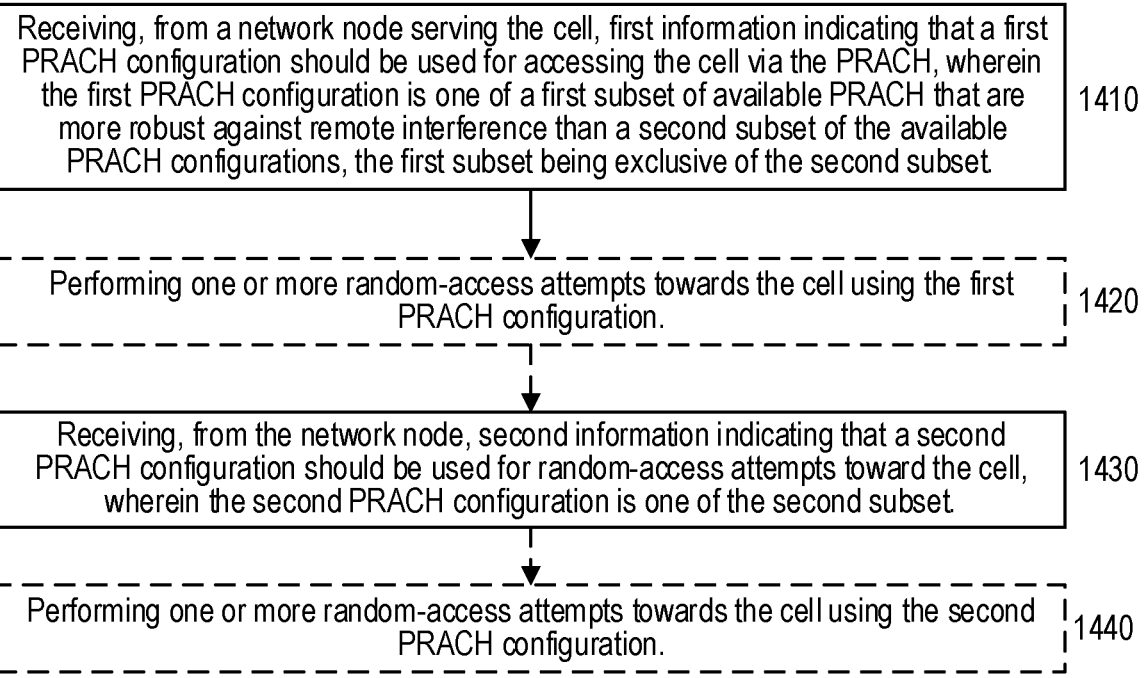
FIG. 14 shows a flow diagram of an exemplary method and/or procedure performed by a UE, according to various exemplary embodiments of the present disclosure.

Embodiments discussed above in relation to FIGS. 9-10 are further illustrated by FIGS. 13-14, which show flow diagrams of exemplary methods and/or procedures performed by a network node and a UE, respectively. For example, aspects of the various embodiments discussed in relation to FIGS. 9-10 are features of the operations shown in FIGS. 13-14.

More specifically, FIG. 13 shows a flow diagram of an exemplary method and/or procedure for configuring a physical random-access channel (PRACH) of a cell in a time-division-duplexed (TDD) radio access network (RAN). The exemplary method and/or procedure can be performed by a network node (e.g., base station, eNB, gNB, etc., or component thereof) in communication with user equipment (e.g., UE, wireless device, IoT device, modem, etc. or component thereof). Furthermore, the exemplary method and/or procedure shown in FIG. 13 can be utilized cooperatively with other exemplary methods and/or procedures described herein (e.g., FIG. 14) to provide various exemplary benefits described herein. Although FIG. 13 shows blocks in a particular order, this order is merely exemplary and the operations of the exemplary method and/or procedure can be performed in a different order than shown, and can be combined and/or divided into blocks having different functionality than shown. Optional blocks and/or operations are indicated by dashed lines.

In some embodiments, the exemplary method and/or procedure illustrated in FIG. 13 can include the operations of block 1310, where the network node can determine a first subset of available PRACH configurations based on observed characteristics of remote interference in the RAN. The first subset of the available PRACH configurations can be more robust against remote interference than a second subset of the available PRACH configurations, and the first subset can be exclusive of the second subset. In other embodiments, the first and second subsets can be predetermined, and/or can be exclusive of other subsets (e.g., third, fourth, etc.) of available PRACH configurations having different characteristics.

In some embodiments, the second subset can be robust against remote interference from a distance less than a second threshold, and the first subset can be robust against remote interference from a distance less than a first threshold. The first threshold can be greater than the second threshold.

The exemplary method and/or procedure can also include operations of block 1320, where the network node can determine an increase in a level of remote interference in the cell. In some embodiments, the operations of block 1320 can include the operations of sub-block 1322, where the network node can determine the increase in the level of remote interference based on detecting an observed increase or an observed rate of increase in the interference levels during one or more uplink (UL) symbols immediately following a downlink-to-uplink (DL-to-UL) switch of the cell transmission direction. In some embodiments, the operations of block 1320 can include the operations of sub-block 1324, where the network node can determine the increase in the level of remote interference based on determining a distribution of propagation delays of the remote interference by estimating interference levels in a plurality of UL symbols immediately following the DL-to-UL switch of the cell transmission direction. In some embodiments, the operations of block 1320 can include the operations of sub-block 1326, where the network node can determine the increase in the level of remote interference based on receiving remote interference management reference signals (RIM-RS). The operations shown in sub-blocks 1322-1326 can be used individually or in various combinations, according to various embodiments.

The exemplary method and/or procedure can also include operations of block 1330, where the network node can select a first PRACH configuration from the first subset. This selection can be in response to determining the increase in the level of remote interference as performed in block 1320. In some embodiments, the first PRACH configuration can be selected to avoid time-domain PRACH occasions during the UL symbols for which the remote interference is determined to be above a predetermined threshold. In some embodiments, the first PRACH configuration can be selected from the first subset based on at least one of the following: the size of the cell; a TDD configuration of the cell; and an SS/PBCH block (SSB) configuration of the cell.

The exemplary method and/or procedure can also include operations of block 1340, where the network node can transmit, to one or more user equipment (UEs), first information indicating that the first PRACH configuration should be used for accessing the cell via the PRACH. In some embodiments, the first information can include a first PRACH configuration index associated with a first random-access preamble format and a first number of valid time-domain PRACH occasions within a PRACH configuration period. In some embodiments, the first information can also indicate a first number of frequency-division multiplexed (FDM) PRACH occasions within each of the valid time-domain PRACH occasions.

In some embodiments, the valid time-domain PRACH occasions within the PRACH configuration period are further based on at least one of the following: a TDD configuration of the cell; and an SSB configuration of the cell. For example, a TDD configuration can include an arrangement of UL subframes and/or slots, DL subframes and/or slots, and GP(s) within a 10-ms radio frame. Since PRACH is an UL channel, valid time-domain PRACH occasions only occur in UL subframes or slots. Similarly, an SSB configuration can include the slots and/or symbols in a 10-ms radio frame in which SSBs are transmitted in the DL. As briefly described above, actually transmitted SSBs in the DL can override an otherwise-valid time-domain PRACH occasion in the UL.

In some embodiments, the exemplary method and/or procedure can also include operations of block 1350, where the network node can determine a decrease in a level of remote interference in the cell. The network node can determine the decrease in various ways, such as in a similar and/or complementary manner to any of the techniques associated with block 1320 and its sub-blocks.

In some embodiments, the exemplary method and/or procedure can also include operations of block 1360, where the network node can select a second PRACH configuration from the second subset. This selection can be in response to determining the decrease in the level of remote interference as performed in block 1350. In some embodiments, the second PRACH configuration can be selected from the second subset based on at least one of the following: the size of the cell; a TDD configuration of the cell; and an SSB configuration of the cell.

In some embodiments, the exemplary method and/or procedure can also include operations of block 1370, where the network node can transmit, to one or more UEs, second information indicating that the second PRACH configuration should be used for accessing the cell via the PRACH. In some embodiments, the second information can include a second PRACH configuration index associated with a second random-access preamble format and a second number of time-domain PRACH occasions within the PRACH configuration period. In some embodiments, the first and second random-access preamble formats can be identical. In some embodiments, the first number of valid time-domain PRACH occasions can be less than the second number of valid time-domain PRACH occasions.

In some embodiments, within a particular uplink (UL) subframe, an earliest valid time-domain PRACH occasion associated with the first PRACH configuration index can occur later than an earliest valid time-domain PRACH occasion associated with the second PRACH configuration index. In some embodiments, the valid time-domain PRACH occasions associated with the first PRACH configuration index can be a subset of the valid time-domain PRACH occasions associated with the second PRACH configuration index.

In some embodiments, the second information can also indicate a second number of FDM PRACH occasions within each of the valid time-domain PRACH occasions. In such embodiments, the first number of FDM PRACH occasions, within each valid time-domain PRACH occasion, can be greater than the second number of FDM PRACH occasions.

In some embodiments, the first information and the second information can be transmitted on a PDSCH. In some embodiments, the first information and the second information can be transmitted on a PBCH.

In addition, FIG. 14 shows a flow diagram of an exemplary method and/or procedure for configuring access to a cell in a time-division-duplexed (TDD) radio access network (RAN) via a physical random-access channel (PRACH). The exemplary method and/or procedure can be performed by a user equipment (e.g., UE, wireless device, IoT device, modem, etc. or component thereof) in communication with a network node (e.g., base station, eNB, gNB, etc., or component thereof). Furthermore, the exemplary method and/or procedure shown in FIG. 14 can be utilized cooperatively with other exemplary methods and/or procedures described herein (e.g., FIG. 13) to provide various exemplary benefits described herein. Although FIG. 14 shows blocks in a particular order, this order is merely exemplary and the operations of the exemplary method and/or procedure can be performed in a different order than shown, and can be combined and/or divided into blocks having different functionality than shown. Optional blocks or operations are indicated by dashed lines.

Exemplary embodiments of the method and/or procedure illustrated in FIG. 14 can include the operations of block 1410, where the UE can receive, from a network node serving the cell, first information indicating that a first PRACH configuration should be used for accessing the cell via the PRACH. The first PRACH configuration can be one of a first subset of available PRACH configurations, which can be more robust against remote interference than a second subset of the available PRACH configurations. The first subset can be exclusive of the second subset. In some embodiments, the first and second subsets can be among a larger number of (i.e., greater than two) subsets of available PRACH configurations.

In some embodiments, the first information can include a first PRACH configuration index associated with a first random-access preamble format and a first number of valid time-domain PRACH occasions within a PRACH configuration period. In some embodiments, the first information can also indicate a first number of frequency-division multiplexed (FDM) PRACH occasions within each of the valid time-domain PRACH occasions.

In some embodiments, the valid time-domain PRACH occasions within the PRACH configuration period are further based on a TDD configuration of the cell and/or an SSB configuration of the cell, in the manner described above in relation to FIG. 13.

In some embodiments, the exemplary method and/or procedure can also include operations of block 1420, where the UE can perform one or more random-access attempts towards the cell using the first PRACH configuration. For example, the operations of block 1420 can be performed after and/or in response to the operations in block 1410. The operations of block 1420 can also be performed before the operations of block 1430, described below.

The exemplary method and/or procedure can also include operations of block 1430, where the UE can subsequently receive, from the network node, second information indicating that a second PRACH configuration should be used for accessing the cell via the PRACH. The second PRACH configuration is one of the second subset. In some embodiments, the second information can include a second PRACH configuration index associated with a second random-access preamble format and a second number of valid time-domain PRACH occasions within a PRACH configuration period. In some embodiments, the first and second random-access preamble formats can be identical. In some embodiments, the first number of valid time-domain PRACH occasions can be less than the second number of valid time-domain PRACH occasions.

In some embodiments, the second information can also indicate a second number of frequency-division multiplexed (FDM) PRACH occasions within each of the valid time-domain PRACH occasions. In some embodiments, the first number of FDM PRACH occasions, within each valid time-domain PRACH occasion, can be greater than the second number of FDM PRACH occasions.

In some embodiments, within a particular uplink (UL) subframe, an earliest valid time-domain PRACH occasion associated with the first PRACH configuration index can occur later than an earliest valid time-domain PRACH occasion associated with the second PRACH configuration index. In some embodiments, the valid time-domain PRACH occasions associated with the first PRACH configuration index can be a subset of the valid time-domain PRACH occasions associated with the second PRACH configuration index.

In some embodiments, the first information and the second information can be received on a PDSCH. In some embodiments, the first information and the second information can be received on a PBCH.

In some embodiments, the exemplary method and/or procedure can also include operations of block 1440, where the UE can perform one or more random-access attempts towards the cell using the second PRACH configuration. For example, the operations of block 1440 can be performed after and/or in response to the operations in block 1430.

Figure 15:
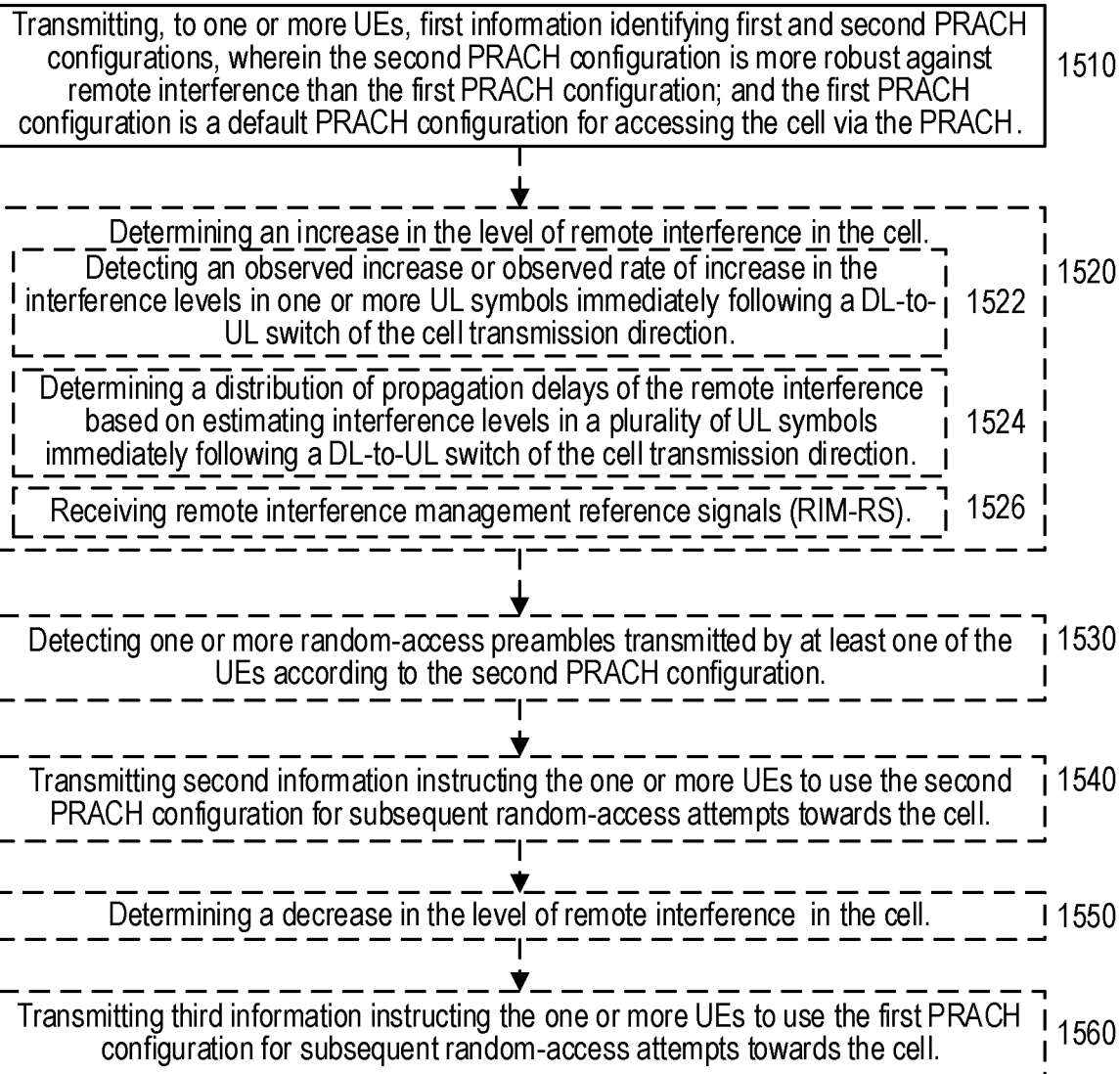
FIG. 15 shows a flow diagram of another exemplary method and/or procedure performed by a network node in a RAN, according to various exemplary embodiments of the present disclosure.

Embodiments discussed above in relation to FIGS. 11-12 are further illustrated by FIGS. 15-16, which show flow diagrams of exemplary methods and/or procedures performed by a network node and a UE, respectively. For example, aspects of the various embodiments discussed in relation to FIGS. 11-12 are features of the operations shown in FIGS. 15-16.

More specifically, FIG. 15 shows a flow diagram of an exemplary method and/or procedure for configuring a physical random-access channel (PRACH) of a cell in a time-division-duplexed (TDD) radio access network (RAN). The exemplary method and/or procedure can be performed by a network node (e.g., base station, eNB, gNB, etc., or component thereof) in communication with user equipment (e.g., UE, wireless device, IoT device, modem, etc. or component thereof). Furthermore, the exemplary method and/or procedure shown in FIG. 15 can be utilized cooperatively with other exemplary methods and/or procedures described herein (e.g., FIG. 16) to provide various exemplary benefits described herein. Although FIG. 15 shows blocks in a particular order, this order is merely exemplary and the operations of the exemplary method and/or procedure can be performed in a different order than shown, and can be combined and/or divided into blocks having different functionality than shown. Optional blocks and/or operations are indicated by dashed lines.

Exemplary embodiments of the method and/or procedure illustrated in FIG. 15 can include the operations of block 1510, where the network node can transmit, to one or more user equipment (UEs), first information identifying: first and second PRACH configurations, wherein second PRACH configuration is more robust against remote interference than the first PRACH configuration; and the first PRACH configuration is a default PRACH configuration for accessing the cell via the PRACH. In some embodiments, the second PRACH configuration can include fewer valid time-domain PRACH occasions than the first PRACH configuration. In some embodiments, the second PRACH configuration can include a different random-access preamble than the first PRACH configuration. In some embodiments, the second PRACH configuration can be a fallback configuration, as discussed in more detail above.

In some embodiments, the first information identifying the first PRACH configuration comprises an index to a first entry in a first PRACH configuration table. In some embodiments, the first information identifying the second PRACH configuration can include an index to a second entry in the first PRACH configuration table. In some embodiments, the first information identifying the second PRACH configuration can include an index to a second entry in a second PRACH configuration table. For example, the second PRACH configuration table can include at least a portion of the first PRACH configuration table and further PRACH configurations that are different from the entries of the first PRACH configuration table.

In some embodiments, the first entry in the first PRACH configuration table include an index to a second entry in the first PRACH configuration table, wherein the second entry is associated with the second PRACH configuration.

In some embodiments, the first entry in the first PRACH configuration table includes a first preamble format, and the second PRACH configuration is associated with all entries of the first table that include the first preamble format.

In some embodiments, the first information identifying the first and second PRACH configurations can include an index to a first entry in a first PRACH configuration table. In such embodiments, the first PRACH configuration can also include a first rule for invalidating PRACH occasions determined according to the first entry, and the second PRACH configuration further comprises a second rule for invalidating PRACH occasions determined according to the first entry. In certain embodiments, the second rule can be configured to invalidate more PRACH occasions than the first rule.

In some embodiments, the exemplary method and/or procedure can also include operations of block 1520, where the network node can determine an increase in the level of remote interference with the cell. This can be done in various ways, such as described above in relation to block 1320 and sub-blocks 1322-1326 of the procedure shown in FIG. 13.

In some embodiments, the exemplary method and/or procedure can also include operations of block 1530, where the network node can detect one or more random-access preambles transmitted by at least one of the UEs according to the second PRACH configuration.

In some embodiments, the exemplary method and/or procedure can also include operations of block 1540, where the network node can transmit second information instructing the one or more UEs to use the second PRACH configuration for subsequent random-access attempts towards the cell. This operation can be performed, for example, in response to the operations of blocks 1520 and/or 1530. In some embodiments, the second information can be transmitted on a PDSCH. In some embodiments, the second information can be transmitted on a PBCH.

In some embodiments, the exemplary method and/or procedure can also include operations of block 1550, where the network node can determine a decrease in the level of remote interference with the cell. The network node can determine the decrease in various ways, such as in a similar and/or complementary manner to any of the techniques associated with block 1320 and its sub-blocks 1322-1326.

In some embodiments, the exemplary method and/or procedure can also include operations of block 1560, where the network node can transmit third information instructing the one or more UEs to use the first PRACH configuration for subsequent random-access attempts towards the cell. This can be performed, for example, in response to the operation of block 1550. In some embodiments, the third information can be transmitted on a PDSCH. In some embodiments, the third information can be transmitted on a PBCH.

In addition, FIG. 16 shows a flow diagram of an exemplary method and/or procedure for configuring access to a cell in a time-division-duplexed (TDD) radio access network (RAN) via a physical random-access channel (PRACH). The exemplary method and/or procedure can be performed by a user equipment (e.g., UE, wireless device, IoT device, modem, etc. or component thereof) in communication with a network node (e.g., base station, eNB, gNB, etc., or component thereof). Furthermore, the exemplary method and/or procedure shown in FIG. 16 can be utilized cooperatively with other exemplary methods and/or procedures described herein (e.g., FIG. 15) to provide various exemplary benefits described herein. Although FIG. 16 shows blocks in a particular order, this order is merely exemplary and the operations of the exemplary method and/or procedure can be performed in a different order than shown, and can be combined and/or divided into blocks having different functionality than shown. Optional blocks and/or operations are indicated by dashed lines.

Exemplary embodiments of the method and/or procedure illustrated in FIG. 16 can include the operations of block 1610, where the UE can receive, from the network node serving the cell, first information identifying: first and second PRACH configurations, wherein second PRACH configuration is more robust against remote interference than the first PRACH configuration; and the first PRACH configuration is a default PRACH configuration for accessing the cell via the PRACH. In some embodiments, the second PRACH configuration can include fewer valid time-domain PRACH occasions than the first PRACH configuration. In some embodiments, the second PRACH configuration can include a different random-access preamble than the first PRACH configuration. In some embodiments, the second PRACH configuration can be a fallback configuration, as discussed in more detail above.

In some embodiments, the first information identifying the first PRACH configuration comprises an index to a first entry in a first PRACH configuration table. In some embodiments, the first information identifying the second PRACH configuration can include an index to a second entry in the first PRACH configuration table. In some embodiments, the first information identifying the second PRACH configuration can include an index to a second entry in a second PRACH configuration table. For example, the second PRACH configuration table can include at least a portion of the first PRACH configuration table and further PRACH configurations that are different from the entries of the first PRACH configuration table.

In some embodiments, the first entry in the first PRACH configuration table include an index to a second entry in the first PRACH configuration table, wherein the second entry is associated with the second PRACH configuration.

In some embodiments, the first entry in the first PRACH configuration table includes a first preamble format, and the second PRACH configuration is associated with all entries of the first table that include the first preamble format.

In some embodiments, the first information identifying the first and second PRACH configurations can include an index to a first entry in a first PRACH configuration table. In such embodiments, the first PRACH configuration can also include a first rule for invalidating PRACH occasions determined according to the first entry, and the second PRACH configuration further comprises a second rule for invalidating PRACH occasions determined according to the first entry. In certain embodiments, the second rule can be configured to invalidate more PRACH occasions than the first rule.

In some embodiments, the exemplary method and/or procedure can also include operations of block 1620, where the UE can perform one or more random-access attempts towards the cell using the first PRACH configuration. In some embodiments, the one or more random-access attempts performed in block 1620 can include a predetermined number of unsuccessful random-access attempts. In some embodiments, the predetermined number of unsuccessful random-access attempts can include one or more unsuccessful detections of a random-access response from the network node.

In some embodiments, the exemplary method and/or procedure can also include operations of block 1630, where the UE can receive, from the network node, second information instructing the UE to use the second PRACH configuration for subsequent random-access attempts towards the cell. In some embodiments, the second information can be received on a PDSCH. In some embodiments, the second information can be received on a PBCH.

In some embodiments, the exemplary method and/or procedure can also include operations of block 1640, where the UE can perform one or more random-access attempts towards the cell using the second PRACH configuration. For example, the operations of block 1640 can be in response to the operations in blocks 1620 and/or 1630.

In some embodiments, the exemplary method and/or procedure can also include operations of block 1650, where the UE can receive, from the network node, third information instructing the UE to use the first PRACH configuration for subsequent random-access attempts towards the cell. In some embodiments, the third information can be received on a PDSCH. In some embodiments, the third information can be received on a PBCH.

In some embodiments, the exemplary method and/or procedure can also include operations of block 1660, where the UE can perform one or more random-access attempts towards the cell using the first PRACH configuration. For example, the operations of block 1660 can be in response to the operation of block 1650.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 17:
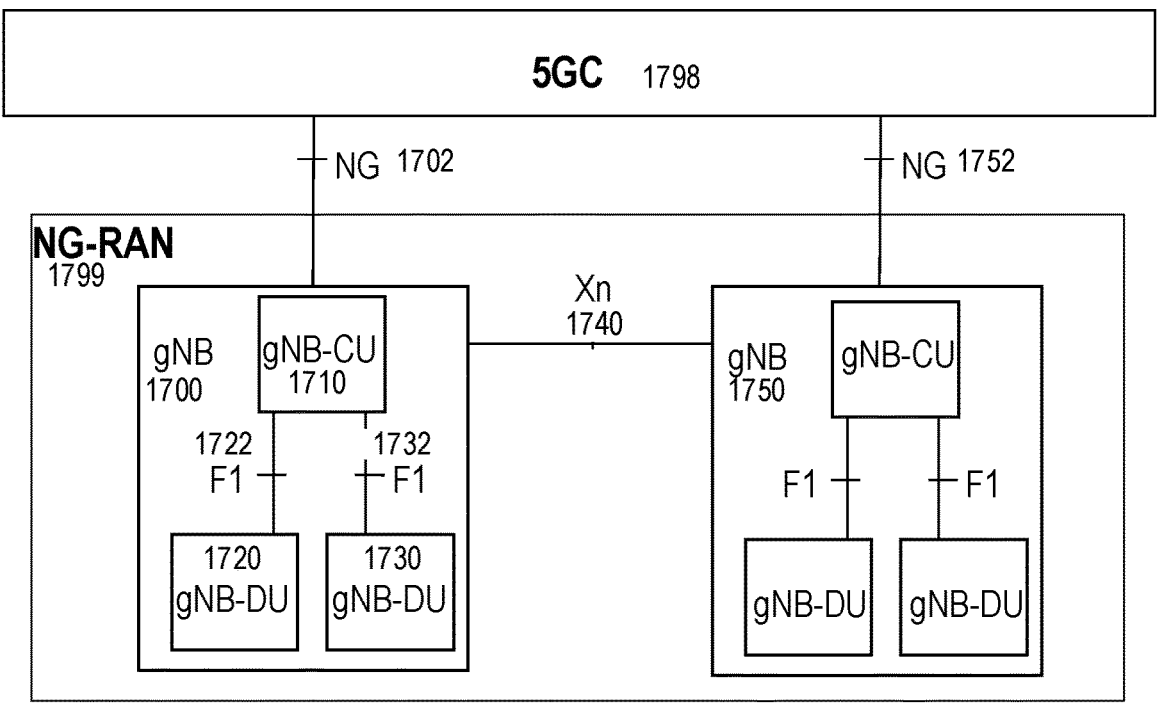
FIGS. 17-18 show two high-level views of an exemplary 5G network architecture.

FIG. 17 illustrates a high-level view of the 5G network architecture, consisting of a Next Generation RAN (NG-RAN) 1799 and a 5G Core (5GC) 1798. NG-RAN 1799 can include a set gNBs connected to the 5GC via one or more NG interfaces, such as gNBs 1700, 1750 connected via interfaces 1702, 1752, respectively. In addition, the gNBs can be connected to each other via one or more Xn interfaces, such as Xn interface 1740 between gNBs 1700 and 1750.

NG-RAN 1799 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on the TNL of NG-RAN interfaces is supported, NDS/IP (3GPP TS 33.401) can be applied.

The NG-RAN logical nodes shown in FIG. 17 (and described in 3GPP TS 38.401 and 3GPP TR 38.801) include a central (or centralized) unit (CU or gNB-CU) and one or more distributed (or decentralized) units (DU or gNB-DU). For example, gNB 1700 includes gNB-CU 1710 and gNB-DUs 1720 and 1730. CUs (e.g., gNB-CU 1710) are logical nodes that host higher-layer protocols and perform various gNB functions such controlling the operation of DUs. Likewise, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 1722 and 1732. The gNB-CU and connected gNB-DUs are only visible to other gNBs and 5GC 1798 as a gNB. In other words, the F1 interface is generally not visible beyond a gNB-CU.

Figure 18:
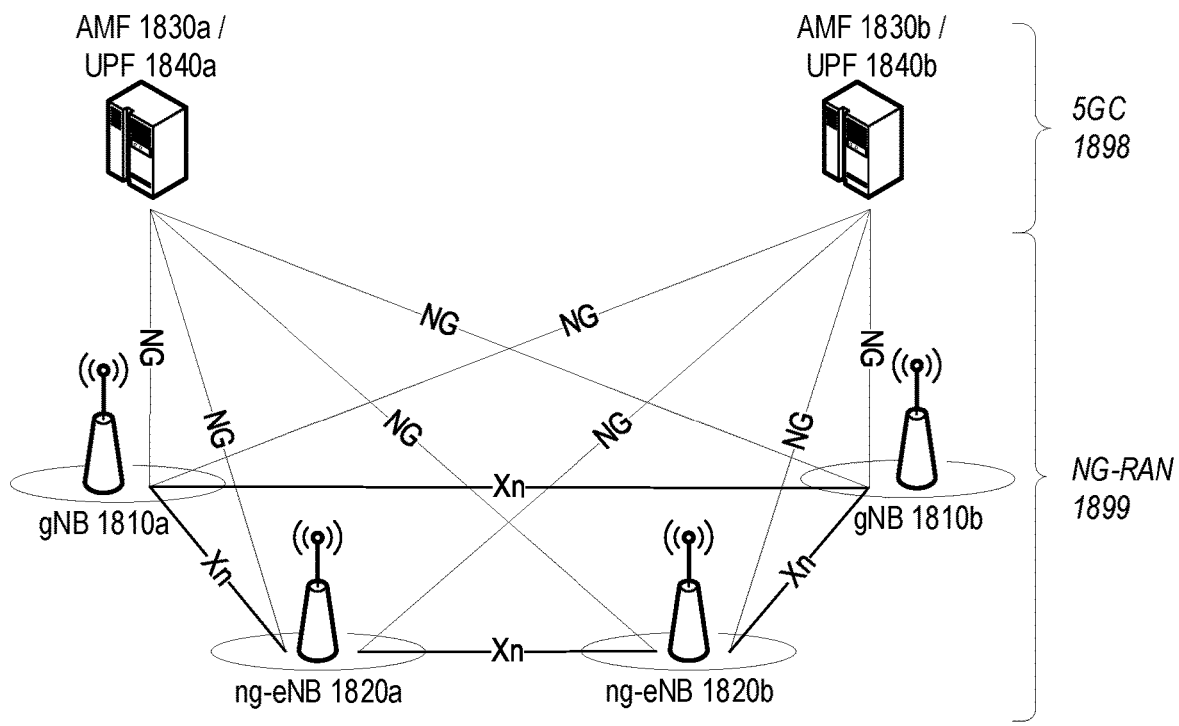

FIG. 18 shows another high-level view of an exemplary 5G network architecture, including NG-RAN 1899 and 5GC 1898. As shown in the figure, NG-RAN 1899 can include gNBs 1810 (e.g., 1810$a,b$) and ng-eNBs 1820 (e.g., 1820$a, b$) that are interconnected with each other via respective Xn interfaces. The gNBs and ng-eNBs are also connected via the NG interfaces to 5GC 1898, more specifically to the AMF (Access and Mobility Management Function) 1830 (e.g., AMFs 1830$a,b$) via respective NG-C interfaces and to the UPF (User Plane Function) 1840 (e.g., UPFs 1840$a,b$) via respective NG-U interfaces.

Each of the gNBs 1810 can support the NR radio interface, including frequency division duplexing (FDD), time division duplexing (TDD), or a combination thereof. Each of ng-eNBs 1820 supports the LTE radio interface and connect to the 5GC via the NG interface, whereas conventional LTE eNBs connect to an EPC via the X2 interface.

Figure 19:
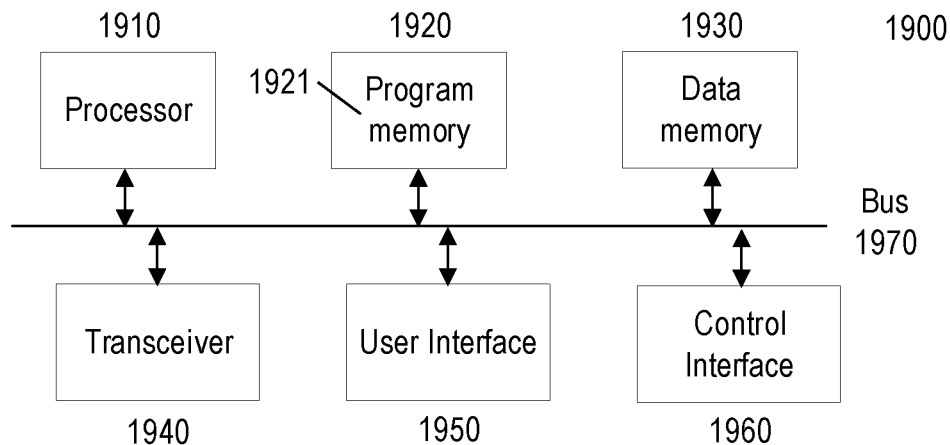
FIG. 19 is a block diagram of an exemplary wireless device or UE according to various exemplary embodiments of the present disclosure.

FIG. 19 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above.

Exemplary device 1900 can comprise a processor 1910 that can be operably connected to a program memory 1920 and/or a data memory 1930 via a bus 1970 that can comprise parallel address and data buses, serial ports, or other methods and/or structures known to those of ordinary skill in the art. Program memory 1920 can store software code, programs, and/or instructions (collectively shown as computer program product 1921 in FIG. 19) executed by processor 1910 that can configure and/or facilitate device 1900 to perform various operations, including operations described below. For example, execution of such instructions can configure and/or facilitate exemplary device 1900 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with transceiver 1940, user interface 1950, and/or host interface 1960.

As another example, processor 1910 can execute program code stored in program memory 1920 that corresponds to MAC, RLC, PDCP, and RRC layer protocols standardized by 3GPP (e.g., for NR and/or LTE). As a further example, processor 1910 can execute program code stored in program memory 1920 that, together with transceiver 1940, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1920 can also comprises software code executed by processor 1910 to control the functions of device 1900, including configuring and controlling various components such as transceiver 1940, user interface 1950, and/or host interface 1960. Program memory 1920 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1920 can comprise an external storage arrangement (not shown) remote from device 1900, from which the instructions can be downloaded into program memory 1920 located within or removably coupled to device 1900, so as to enable execution of such instructions.

Data memory 1930 can comprise memory area for processor 1910 to store variables used in protocols, configuration, control, and other functions of device 1900, including operations corresponding to, or comprising, any of the exemplary methods and/or procedures described herein. Moreover, program memory 1920 and/or data memory 1930 can comprise non-volatile memory (e.g., flash memory), volatile memory (e.g., static or dynamic RAM), or a combination thereof. Furthermore, data memory 1930 can comprise a memory slot by which removable memory cards in one or more formats (e.g., SD Card, Memory Stick, Compact Flash, etc.) can be inserted and removed. Persons of ordinary skill in the art will recognize that processor 1910 can comprise multiple individual processors (including, e.g., multi-core processors), each of which implements a portion of the functionality described above. In such cases, multiple individual processors can be commonly connected to program memory 1920 and data memory 1930 or individually connected to multiple individual program memories and or data memories. More generally, persons of ordinary skill in the art will recognize that various protocols and other functions of device 1900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A transceiver 1940 can comprise radio-frequency transmitter and/or receiver circuitry that facilitates the device 1900 to communicate with other equipment supporting like wireless communication standards and/or protocols. In some exemplary embodiments, the transceiver 1940 includes a transmitter and a receiver that enable device 1900 to communicate with various 5G/NR networks according to various protocols and/or methods proposed for standardization by 3GPP and/or other standards bodies. For example, such functionality can operate cooperatively with processor 1910 to implement a PHY layer based on OFDM, OFDMA, and/or SC-FDMA technologies, such as described herein with respect to other figures.

In some exemplary embodiments, the transceiver 1940 includes an LTE transmitter and receiver that can facilitate the device 1900 to communicate with various LTE, LTE-Advanced (LTE-A), and/or NR networks according to standards promulgated by 3GPP. In some exemplary embodiments of the present disclosure, the transceiver 1940 includes circuitry, firmware, etc. necessary for the device 1900 to communicate with various 5G/NR, LTE, LTE-A, UMTS, and/or GSM/EDGE networks, also according to 3GPP standards. In some exemplary embodiments of the present disclosure, transceiver 1940 includes circuitry, firmware, etc. necessary for the device 1900 to communicate with various CDMA2000 networks, according to 3GPP2 standards.

In some exemplary embodiments of the present disclosure, the transceiver 1940 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, transceiver 1940 can comprise a transceiver that is capable of wired communication, such as by using IEEE 802.3 Ethernet technology. The functionality particular to each of these embodiments can be coupled with or controlled by other circuitry in the device 1900, such as the processor 1910 executing program code stored in program memory 1920 in conjunction with, or supported by, data memory 1930.

User interface 1950 can take various forms depending on the particular embodiment of device 1900, or can be absent from device 1900 entirely. In some exemplary embodiments, user interface 1950 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1900 can comprise a tablet computing device including a larger touchscreen display. In such embodiments, one or more of the mechanical features of the user interface 1950 can be replaced by comparable or functionally equivalent virtual user interface features (e.g., virtual keypad, virtual buttons, etc.) implemented using the touchscreen display, as familiar to persons of ordinary skill in the art. In other embodiments, the device 1900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1900 having a touch screen display are capable of receiving user inputs, such as inputs related to exemplary methods and/or procedures described herein or otherwise known to persons of ordinary skill in the art.

In some exemplary embodiments of the present disclosure, device 1900 can comprise an orientation sensor, which can be used in various ways by features and functions of device 1900. For example, the device 1900 can use outputs of the orientation sensor to determine when a user has changed the physical orientation of the device 1900's touch screen display. An indication signal from the orientation sensor can be available to any application program executing on the device 1900, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1960 of the device 1900 can take various forms depending on the particular exemplary embodiment of device 1900 and of the particular interface requirements of other devices that the device 1900 is intended to communicate with and/or control. For example, the control interface 1960 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1960 can comprise an IEEE 802.3 Ethernet interface such as described above. In some exemplary embodiments of the present disclosure, the control interface 1960 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1900 can comprise more functionality than is shown in FIG. 19 including, for example, a video and/or still-image camera, microphone, media player and/or recorder, etc. Moreover, transceiver 1940 can include circuitry necessary to communicate using additional radio-frequency communication standards including Bluetooth, GPS, and/or others. Moreover, the processor 1910 can execute software code stored in the program memory 1920 to control such additional functionality. For example, directional velocity and/or position estimates output from a GPS receiver can be available to any application program executing on the device 1900, including various exemplary methods and/or computer-readable media according to various exemplary embodiments of the present disclosure.

Figure 20:
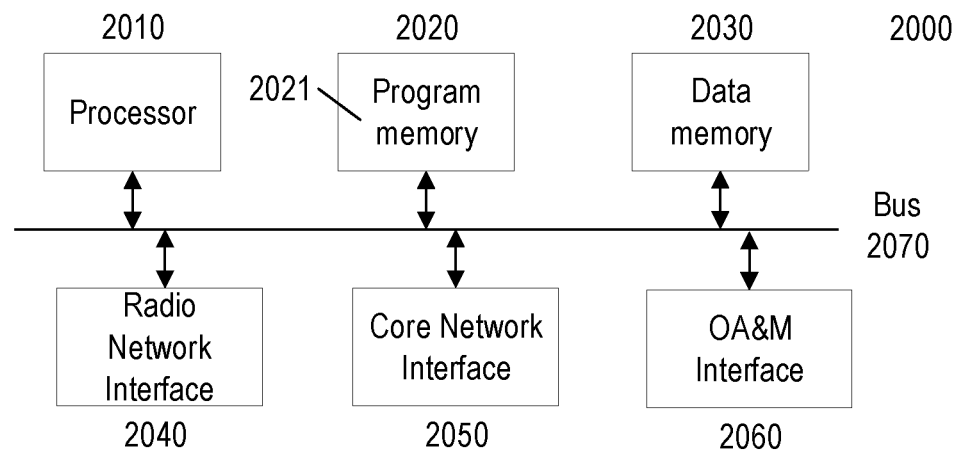
FIG. 20 is a block diagram of an exemplary network node according to various exemplary embodiments of the present disclosure.

FIG. 20 shows a block diagram of an exemplary network node 2000 configurable according to various embodiments of the present disclosure, including those described above with reference to other figures. In some exemplary embodiments, network node 2000 can comprise a base station, eNB, gNB, or component thereof. Network node 2000 comprises processor 2010 which is operably connected to program memory 2020 and data memory 2030 via bus 2070, which can comprise parallel address and data buses, serial ports, or other methods and/or structures known to those of ordinary skill in the art.

Program memory 2020 can store software code, programs, and/or instructions (collectively shown as computer program product 2021 in FIG. 20) executed by processor 2010 that can configure and/or facilitate network node 2000 to perform various operations, including operations described below. For example, execution of such stored instructions can configure network node 2000 to communicate with one or more other devices using protocols according to various embodiments of the present disclosure, including one or more exemplary methods and/or procedures discussed above. Furthermore, execution of such stored instructions can also configure and/or facilitate network node 2000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 2040 and core network interface 2050. By way of example and without limitation, core network interface 2050 can comprise the S1 interface and radio network interface 2050 can comprise the Uu interface, as standardized by 3GPP. Program memory 2020 can also include software code executed by processor 2010 to control the functions of network node 2000, including configuring and controlling various components such as radio network interface 2040 and core network interface 2050.

Data memory 2030 can comprise memory area for processor 2010 to store variables used in protocols, configuration, control, and other functions of network node 2000. As such, program memory 2020 and data memory 2030 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 2010 can comprise multiple individual processors (not shown), each of which implements a portion of the functionality described above. In such case, multiple individual processors may be commonly connected to program memory 2020 and data memory 2030 or individually connected to multiple individual program memories and/or data memories. More generally, persons of ordinary skill in the art will recognize that various protocols and other functions of network node 2000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 2040 can comprise transmitters, receivers, signal processors, ASICs, antennas, beamforming units, and other circuitry that enables network node 2000 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 2040. According to further exemplary embodiments of the present disclosure, the radio network interface 2040 can comprise a PHY layer based on OFDM, OFDMA, and/or SC-FDMA technologies. In some embodiments, the functionality of such a PHY layer can be provided cooperatively by radio network interface 2040 and processor 2010 (including program code in memory 2020).

Core network interface 2050 can comprise transmitters, receivers, and other circuitry that enables network node 2000 to communicate with other equipment in a core network such as, in some embodiments, circuit-switched (CS) and/or packet-switched Core (PS) networks. In some embodiments, core network interface 2050 can comprise the S1 interface standardized by 3GPP. In some exemplary embodiments, core network interface 2050 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 2050 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 2060 can comprise transmitters, receivers, and other circuitry that enables network node 2000 to communicate with external networks, computers, databases, and the like for purposes of operations, administration, and maintenance of network node 2000 or other network equipment operably connected thereto. Lower layers of OA&M interface 2060 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 2040, core network interface 2050, and OA&M interface 2060 may be multiplexed together on a single physical interface, such as the examples listed above.

Figure 21:
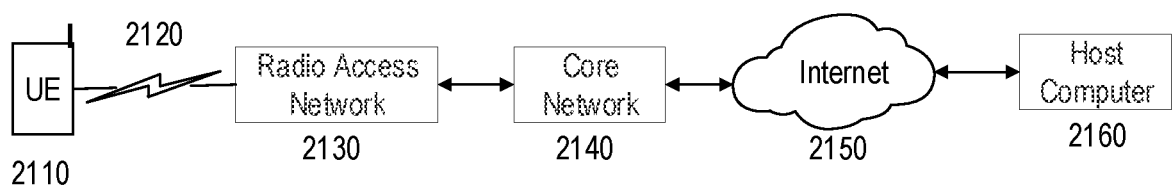
FIG. 21 is a block diagram of an exemplary network configured to provide over-the-top (OTT) data services between a host computer and a UE, according to various exemplary embodiments of the present disclosure.

FIG. 21 is a block diagram of an exemplary communication network configured to provide over-the-top (OTT) data services between a host computer and a user equipment (UE), according to one or more exemplary embodiments of the present disclosure. UE 2110 can communicate with radio access network (RAN) 2130 over radio interface 2120, which can be based on protocols described above including, e.g., LTE, LTE-A, and 5G/NR. For example, UE 2110 can be configured and/or arranged as shown in other figures discussed above. RAN 2130 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2130 can cooperatively operate using licensed and unlicensed spectrum.

RAN 2130 can further communicate with core network 2140 according to various protocols and interfaces described above. For example, one or more apparatus (e.g., base stations, eNBs, gNBs, etc.) comprising RAN 2130 can communicate to core network 2140 via core network interface 2150 described above. In some exemplary embodiments, RAN 2130 and core network 2140 can be configured and/or arranged as shown in other figures discussed above. For example, eNBs comprising an E-UTRAN 2130 can communicate with an EPC core network 2140 via an S1 interface, such as illustrated in FIG. 1. As another example, gNBs comprising a NR RAN 2130 can communicate with a 5GC core network 2130 via an NG interface, such as illustrated in FIGS. 12-13.

Core network 2140 can further communicate with an external packet data network, illustrated in FIG. 21 as Internet 2150, according to various protocols and interfaces known to persons of ordinary skill in the art. Many other devices and/or networks can also connect to and communicate via Internet 2150, such as exemplary host computer 2160. In some exemplary embodiments, host computer 2160 can communicate with UE 2110 using Internet 2150, core network 2140, and RAN 2130 as intermediaries. Host computer 2160 can be a server (e.g., an application server) under ownership and/or control of a service provider. Host computer 2160 can be operated by the OTT service provider or by another entity on the service provider's behalf.

For example, host computer 2160 can provide an over-the-top (OTT) packet data service to UE 2110 using facilities of core network 2140 and RAN 2130, which can be unaware of the routing of an outgoing/incoming communication to/from host computer 2160. Similarly, host computer 2160 can be unaware of routing of a transmission from the host computer to the UE, e.g., the routing of the transmission through RAN 2130. Various OTT services can be provided using the exemplary configuration shown in FIG. 21 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 21 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 2130 to detect random accesses by UEs—such as UE 2110—even in the presence of remote interference. When used in UEs (e.g., UE 2110) and/or network nodes (e.g., gNBs comprising RAN 2130), exemplary embodiments described herein can provide various improvements, benefits, and/or advantages that facilitate UEs to access network resources and OTT services more consistently and without interruption. This improves the availability and/or performance of these services as experienced by OTT service providers and end-users, including more consistent data throughout and fewer delays without excessive UE power consumption or other reductions in user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

As described herein, a "network node" is also referred to as a "base station." However, a "network node" can correspond to any type of node, in a network, that can communicate with a UE and/or with another network node. Other examples of network nodes include multi-standard radio (MSR) radio node (such as MSR BS), eNodeB (or eNB), gNodeB (or gNB), MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), etc.

Also, the term "radio access technology" (or "RAT") can refer to any RAT including UTRA, E-UTRA, narrow band internet of things (NB-IoT), WiFi, Bluetooth, next generation RAT (NR), 4G, 5G, etc. Furthermore, network nodes can be capable of supporting a single RAT or multiple RATs, depending on the particular embodiment.

Also, the term "signal" as used herein can refer to any physical signal or physical channel. Examples of DL physical signals include reference signal (RS) such as PSS, SSS, CRS, PRS, CSI-RS, DMRS, NRS, NPSS, NSSS, SS, MBSFN RS, etc. Examples of UL physical signals include reference signal such as SRS, DMRS, etc. The term "physical channel" (e.g., in the context of channel reception) is used herein interchangeably with the term "channel." For example, a physical channel can carry higher layer information (e.g., RRC, logical control channel, etc.).

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the methods, apparatus, and computer-readable media described herein include, but are not limited to, the following enumerated examples:

1. A method for configuring a physical random-access channel (PRACH) of a cell in a time-division-duplexed (TDD) radio access network (RAN), the method comprising:
   selecting a first subset of available PRACH configurations, wherein:
      the PRACH configurations comprising the first subset are more robust against remote interference than a second subset of the available PRACH configurations; and
      the first subset is exclusive of the second subset;
   selecting a first PRACH configuration from the first subset; and
   transmitting, to one or more user equipment (UEs), first information indicating that the first PRACH configuration should be used for random-access attempts toward the cell.

2. The method of embodiment 1, further comprising determining an increase in a level of remote interference in the cell, wherein selecting the first PRACH configuration from the first subset is in response to determining the increase.

3. The method of any of embodiments 1-2, wherein the first information includes a first PRACH configuration index associated with: a first random-access preamble format and a first number of time-domain PRACH occasions within a PRACH configuration period.

4. The method of embodiment 3, wherein the first information also indicates a first number of frequency-division multiplexed (FDM) PRACH occasions within each of the time-domain PRACH occasions.

5. The method of any of embodiments 1-4, further comprising:
   selecting a second PRACH configuration from the second subset; and
   transmitting, to the one or more UEs, second information indicating that the second PRACH configuration should be used for subsequent random-access attempts towards the cell.

6. The method of embodiment 5, further comprising determining a decrease in a level of remote interference in the cell, wherein selecting the second PRACH configuration from the first subset is in response to determining the increase.

7. The method of any of embodiments 5-6, wherein the second information includes a second PRACH configuration index associated with a second random-access preamble format and a second number of time-domain PRACH occasions within a PRACH configuration period.

8. The method of embodiment 7, wherein the second information also indicates a second number of frequency-division multiplexed (FDM) PRACH occasions within each of the time-domain PRACH occasions.

9. The method of any of embodiments 7-8, wherein the first number of time-domain PRACH occasions is less than the second number of time-domain PRACH occasions.

10. The method of any of embodiments 5-9, wherein within a particular uplink (UL) subframe, an initial time-domain PRACH occasion associated with the first PRACH configuration index occurs later than an initial time-domain PRACH occasion associated with the second PRACH configuration index.

11. The method of any of embodiments 5-10, wherein the time-domain PRACH occasions associated with the first PRACH configuration index are a subset of the time-domain PRACH occasions associated with the second PRACH configuration index.
12. The method of any of embodiments 7-11, wherein the first number of FDM PRACH occasions, within each time-domain PRACH occasion, is greater than the second number of FDM PRACH occasions.
13. The method of any of embodiments 7-12, wherein the first and second random-access preamble formats are identical.
14. The method of any of embodiments 5-13, wherein the selection of the first PRACH configuration from the first subset and the selection of the second PRACH configuration from the second subset are based on the size of the cell.
15. The method of any of embodiments 2-14, wherein determining an increase in the level of remote interference comprises detecting an observed increase or an observed rate of increase in the interference levels during one or more uplink (UL) symbols immediately following a downlink-to-uplink (DL-to-UL) switch of the cell transmission direction.
16. The method of any of embodiments 2-15, wherein determining an increase in the level of remote interference comprises determining a distribution of propagation delays of the remote interference based on estimating interference levels in a plurality of uplink (UL) symbols immediately following a downlink-to-uplink (DL-to-UL) switch of the cell transmission direction.
17. The method of any of embodiments 2-16, wherein the level of remote interference is determined based on receiving remote interference management reference signals (RIM-RS).
18. The method of any of embodiments 2-17, wherein the first PRACH configuration is selected to avoid time-domain PRACH occasions during the UL symbols for which the remote interference is determined to be above a predetermined threshold.
19. The method of any of embodiments 5-18, wherein the first information and the second information are transmitted on a physical downlink shared channel (PDSCH).
20. The method of any of embodiments 5-18, wherein the first information and the second information are transmitted on a physical broadcast channel (PBCH).
21. The method of any of embodiments 1-20, wherein the first subset is selected based on observed characteristics of remote interference in the RAN.
22. A method for performing random-access, via a physical random-access channel (PRACH), towards a cell in a time-division-duplexed (TDD) radio access network (RAN), the method comprising:
receiving, from a network node serving the cell, first information indicating that a first PRACH configuration should be used for random-access attempts toward the cell, wherein:
the first PRACH configuration is one of a first subset of available PRACH configurations;
the PRACH configurations comprising the first subset are more robust against remote interference than a second subset of the available PRACH configurations, the first subset being exclusive of the second subset;
subsequently receiving, from the network node, second information indicating that a second PRACH configuration should be used for random-access attempts toward the cell, wherein the second PRACH configuration is one of the second subset.
23. The method of embodiment 22, wherein:
the first information includes a first PRACH configuration index associated with a first random-access preamble format and a first number of time-domain PRACH occasions within a PRACH configuration period; and
the second information includes a second PRACH configuration index associated with a second random-access preamble format and a second number of time-domain PRACH occasions within the PRACH configuration period.
24. The method of embodiment 23, wherein the first number of time-domain PRACH occasions is less than the second number of time-domain PRACH occasions.
25. The method of any of embodiments 23-24, wherein within a particular uplink (UL) subframe, an initial time-domain PRACH occasion associated with the first PRACH configuration index occurs later than an initial time-domain PRACH occasion associated with the second PRACH configuration index.
26. The method of any of embodiments 23-25, wherein the time-domain PRACH occasions associated with the first PRACH configuration index are a subset of the time-domain PRACH occasions associated with the second PRACH configuration index.
27. The method of any of embodiments 23-26, wherein:
the first information also indicates a first number of frequency-division multiplexed (FDM) PRACH occasions within each of the time-domain PRACH occasions; and
the second information also indicates a second number of FDM PRACH occasions within each of the time-domain PRACH occasions.
28. The method of embodiment 27, wherein the first number of FDM PRACH occasions, within each time-domain PRACH occasion, is greater than the second number of FDM PRACH occasions.
29. The method of any of embodiments 23-28, wherein the first and second random-access preamble formats are identical.
30. The method of any of embodiments 22-29, wherein the first information and the second information are received on a physical downlink shared channel (PDSCH).
31. The method of any of embodiments 22-29, wherein the first information and the second information are received on a physical broadcast channel (PBCH).
32. The method of any of embodiments 22-31, further comprising performing one or more random-access attempts towards the cell using the first PRACH configuration before receiving the second information.
33. The method of any of embodiments 22-32, further comprising performing one or more random-access attempts towards the cell using the second PRACH configuration after receiving the second information.
34. A network node arranged to configure a physical random-access channel (PRACH) of a cell in a time-division-duplexed (TDD) radio access network (RAN), the network node comprising:
communication circuitry configured to communicate with the UEs; and
processing circuitry operatively associated with the communication circuitry and configured to perform operations corresponding to the methods of any of exemplary embodiments 1-21.
35. A user equipment (UE) configured to perform random-access, via a physical random-access channel (PRACH), towards a cell in a time-division-duplexed (TDD) radio access network (RAN), the UE comprising:

communication circuitry configured to communicate with a network node serving the cell; and processing circuitry operatively associated with the communication circuitry and configured to perform operations corresponding to the methods of any of exemplary embodiments 22-33.

36. A non-transitory, computer-readable medium storing computer-executable instructions that, when executed by at least one processor of a network node, configure the network node to perform operations corresponding to the methods of any of exemplary embodiments 1-21.

37. A non-transitory, computer-readable medium storing computer-executable instructions that, when executed by at least one processor of a user equipment (UE), configure the UE to perform operations corresponding to the methods of any of exemplary embodiments 22-33.

The invention claimed is:

1. A method, performed by a network node, for configuring a physical random-access channel (PRACH) of a cell in a time-division-duplexed (TDD) radio access network (RAN), the method comprising:
    determining an increase in a level of remote interference in the cell, wherein determining the increase in the level of remote interference comprises one or more of the following:
        detecting an observed increase or an observed rate of increase in interference levels during one or more uplink (UL) symbols immediately following a downlink-to-uplink switch of a cell transmission direction;
        determining a distribution of propagation delays of the remote interference by estimating interference levels in a plurality of UL symbols immediately following a downlink-to-uplink switch of the cell transmission direction; and
        receiving remote interference management reference signals (RIM-RS);
    in response to determining the increase, selecting a first PRACH configuration from a first subset of available PRACH configurations, wherein:
        the first subset of available PRACH configurations is more robust against remote interference than a second subset of the available PRACH configurations, and
        the first subset is exclusive of the second subset; and
    transmitting, to one or more user equipment (UEs), first information indicating that the first PRACH configuration should be used for accessing the cell via the PRACH.

2. The method of claim 1, further comprising determining the first subset based on observed characteristics of remote interference in the RAN.

3. The method of claim 1, wherein the first information includes a first PRACH configuration index associated with:
    a first random-access preamble format, and
    a first number of valid time-domain PRACH occasions within a PRACH configuration period, wherein the valid time-domain PRACH occasions within the PRACH configuration period are further based on at least one of the following:
        a TDD configuration of the cell; and
        an SS/PBCH block (SSB) configuration of the cell, and
    wherein the first information also indicates a first number of frequency-division multiplexed (FDM) PRACH occasions within each of the valid time-domain PRACH occasions.

4. The method of claim 1, further comprising:
    determining a decrease in a level of remote interference in the cell;
    in response to determining the decrease, selecting a second PRACH configuration from the second subset; and
    transmitting, to the one or more UEs, second information indicating that the second PRACH configuration should subsequently be used for accessing the cell via the PRACH, wherein the second information includes a second PRACH configuration index associated with:
        a second random-access preamble format, and
        a second number of valid time-domain PRACH occasions within a PRACH configuration period, and
    wherein the first number of valid time-domain PRACH occasions is less than the second number of valid time-domain PRACH occasions.

5. The method of claim 4, wherein the valid time-domain PRACH occasions associated with the first PRACH configuration index are a subset of the valid time-domain PRACH occasions associated with the second PRACH configuration index.

6. The method of claim 4, wherein within a particular uplink subframe, an earliest valid time-domain PRACH occasion associated with the first PRACH configuration index occurs later than an earliest valid time-domain PRACH occasion associated with the second PRACH configuration index.

7. The method of claim 4, wherein:
    the second information also indicates a second number of frequency-division multiplexed (FDM) PRACH occasions within each of the valid time-domain PRACH occasions; and
    the first number of FDM PRACH occasions, within each valid time-domain PRACH occasion, is greater than the second number of FDM PRACH occasions,
    wherein the first and second random-access preamble formats are identical.

8. The method of claim 4, wherein the selection of the first PRACH configuration from the first subset and the selection of the second PRACH configuration from the second subset are based on at least one of the following: a size of the cell; a TDD configuration of the cell; and an SS/PBCH block (SSB) configuration of the cell.

9. The method of claim 1, wherein the first PRACH configuration is selected to avoid time-domain PRACH occasions during the uplink (UL) symbols for which the remote interference is determined to be above a predetermined threshold.

10. The method of claim 1, wherein:
    the second subset is robust against remote interference from a distance less than a second threshold;
    the first subset is robust against remote interference from a distance less than a first threshold; and
    the first threshold is greater than the second threshold.

11. A method, performed by a user equipment (UE) for configuring access to a cell in a time-division-duplexed (TDD) radio access network (RAN) via a physical random-access channel (PRACH), the method comprising:
    receiving, from a network node serving the cell, first information indicating that a first PRACH configuration should be used for accessing the cell via the PRACH, wherein:
        the first PRACH configuration is one of a first subset of available PRACH configurations,
        the first subset of available PRACH configurations is more robust against remote interference than a second subset of the available PRACH configurations, and the first subset is exclusive of the second subset,
the second subset is robust against remote interference from a distance less than a second threshold,
the first subset is robust against remote interference from a distance less than a first threshold, and
the first threshold is greater than the second threshold; and subsequently receiving, from the network node, second information indicating that a second PRACH configuration should subsequently be used for accessing the cell via the PRACH, wherein the second PRACH configuration is one of the second subset.

12. The method of claim 11, wherein:
the first information includes a first PRACH configuration index associated with:
  a first random-access preamble format, and
  a first number of valid time-domain PRACH occasions within a PRACH configuration period; and
the second information includes a second PRACH configuration index associated with:
  a second random-access preamble format, and
  a second number of valid time-domain PRACH occasions within the PRACH configuration period.

13. The method of claim 12, wherein the first number of valid time-domain PRACH occasions is less than the second number of valid time-domain PRACH occasions.

14. The method of claim 12, wherein the valid time-domain PRACH occasions associated with the first PRACH configuration index are a subset of the valid time-domain PRACH occasions associated with the second PRACH configuration index.

15. The method of claim 12, wherein within a particular uplink subframe, an earliest valid time-domain PRACH occasion associated with the first PRACH configuration index occurs later than an earliest valid time-domain PRACH occasion associated with the second PRACH configuration index.

16. The method of claim 11, wherein:
the first information also indicates a first number of frequency-division multiplexed (FDM) PRACH occasions within each of the valid time-domain PRACH occasions;
the second information also indicates a second number of FDM PRACH occasions within each of the valid time-domain PRACH occasions; and
the first number of FDM PRACH occasions is greater than the second number of FDM PRACH occasions, and
wherein the first and second random-access preamble formats are identical.

17. The method of claim 11, further comprising one or more of the following:
performing one or more random-access attempts towards the cell using the first PRACH configuration before receiving the second information; and
performing one or more random-access attempts towards the cell using the second PRACH configuration after receiving the second information.

18. A method, performed by a network node, for configuring a physical random-access channel (PRACH) of a cell in a time-division-duplexed (TDD) radio access network (RAN), the method comprising:
determining an increase in a level of remote interference in the cell;
in response to determining the increase, selecting a first PRACH configuration from a first subset of available PRACH configurations, wherein:
  the first PRACH configuration is selected to avoid time-domain PRACH occasions during uplink (UL) symbols for which the remote interference is determined to be above a predetermined threshold,
  the first subset of available PRACH configurations is more robust against remote interference than a second subset of the available PRACH configurations, and
  the first subset is exclusive of the second subset; and
transmitting, to one or more user equipment (UEs), first information indicating that the first PRACH configuration should be used for accessing the cell via the PRACH.

* * * * *